United States Patent
Menicovich et al.

(10) Patent No.: US 12,553,431 B2
(45) Date of Patent: Feb. 17, 2026

(54) PRODUCTION TECHNIQUE OF SYNTHETIC JET ACTUATORS

(71) Applicant: Actasys, Inc., Brooklyn, NY (US)

(72) Inventors: David Menicovich, Hoboken, NJ (US); Daniele Gallardo, New Milford, NJ (US); Michael Amitay, Loudonville, NY (US); Thomas Wideman, Milton, MA (US); Anthony Mickalauskas, Troy, NY (US); Brian Cyr, Cortland, NY (US)

(73) Assignee: Actasys Inc., New York, NY (US)

( * ) Notice: Subject to any disclaimer, the term of this patent is extended or adjusted under 35 U.S.C. 154(b) by 0 days.

(21) Appl. No.: 18/495,708

(22) Filed: Oct. 26, 2023

(65) Prior Publication Data

US 2024/0328441 A1    Oct. 3, 2024

Related U.S. Application Data

(63) Continuation of application No. 17/136,422, filed on Dec. 29, 2020, now abandoned.

(Continued)

(51) Int. Cl.
   *F04B 45/04* (2006.01)
   *F04B 17/00* (2006.01)
   (Continued)

(52) U.S. Cl.
   CPC ........ *F04B 45/041* (2013.01); *F04B 39/0038* (2013.01); *F04B 45/043* (2013.01);
   (Continued)

(58) Field of Classification Search
   CPC .......... F15D 1/12; F15D 1/0095; F15D 1/008; Y02T 50/10; F04B 43/04; F04B 17/003;
   (Continued)

(56) References Cited

U.S. PATENT DOCUMENTS 3,698,510 A * 10/1972 Blatt ................... F01N 13/20
                                                    181/258
5,478,211 A * 12/1995 Dominiak ........... A61M 39/281
                                                    607/153
(Continued)

FOREIGN PATENT DOCUMENTS

CN       101520041       9/2009
CN       106150988       11/2016
(Continued)

OTHER PUBLICATIONS

Yao, "Synthetic Jets in Quiescent Air", 2007; https://ntrs.nasa.gov/api/citations/20070031090/downloads/20070031090.pdf (Year: 2007).*

(Continued)

*Primary Examiner* — Nathan C Zollinger

(57) ABSTRACT

A clampless synthetic jet actuator includes a cavity layer having an internal cavity for reception of a fluid volume and an orifice providing a fluid communication between the cavity and an external atmosphere; and an oscillatory membrane having a piezoelectric material adapted to deflect the oscillatory membrane in response to an electrical signal. The cavity has an opening in at least one planar surface of the cavity layer, and the cavity layer and the oscillatory membrane are joined by a high strength, low shear modulus adhesive material with the oscillatory membrane positioned adjacent to the planar surface having the cavity opening and adapted as an enclosing surface to said cavity opening. The oscillatory membrane is adapted to compress and expand a volume within the cavity, based on a deflection generated by the piezoelectric material, for generating a fluid flow between the cavity and the external atmosphere through the orifice.

35 Claims, 13 Drawing Sheets

Related U.S. Application Data

(60) Provisional application No. 62/954,491, filed on Dec. 29, 2019, provisional application No. 62/954,492, filed on Dec. 29, 2019.

(51) Int. Cl.
*F04B 39/00* (2006.01)
*F04B 45/047* (2006.01)
*F15D 1/12* (2006.01)
*F15D 1/00* (2006.01)

(52) U.S. Cl.
CPC .............. *F04B 45/047* (2013.01); *F15D 1/12* (2013.01); *F04B 17/003* (2013.01); *F15D 1/0095* (2013.01)

(58) Field of Classification Search
CPC .... F04B 45/041; F04B 45/043; F04B 45/047; F04B 39/0027; F04B 39/0038
See application file for complete search history.

(56) References Cited

U.S. PATENT DOCUMENTS

| | | | |
|---|---|---|---|
| 6,042,345 A * | 3/2000 | Bishop | F04B 17/003 417/322 |
| 7,285,333 B2 | 10/2007 | Wideman et al. | |
| 7,807,013 B2 | 10/2010 | Wideman et al. | |
| 8,076,000 B2 | 12/2011 | Domine | |
| 8,308,078 B2 | 11/2012 | Arik et al. | |
| 8,564,217 B2 | 10/2013 | Han et al. | |
| 8,820,658 B2 * | 9/2014 | Saddoughi | H10N 30/2047 239/102.2 |
| 8,841,820 B2 * | 9/2014 | Bennett | F04B 17/003 310/331 |
| 9,215,520 B2 * | 12/2015 | de Bock | H10N 30/204 |
| 9,468,943 B2 | 10/2016 | Arik et al. | |
| 9,803,666 B2 * | 10/2017 | Whalen | F04B 45/047 |
| 2008/0174620 A1 * | 7/2008 | Tanner | B41J 2/14201 347/10 |
| 2009/0167109 A1 | 7/2009 | Tomita et al. | |
| 2009/0232684 A1 | 9/2009 | Hirata et al. | |
| 2011/0141691 A1 * | 6/2011 | Slaton | H05K 7/20145 156/64 |
| 2012/0170216 A1 * | 7/2012 | Arik | H01L 23/4735 361/688 |
| 2014/0271277 A1 | 9/2014 | Whalen et al. | |
| 2017/0283043 A1 | 10/2017 | Bauer et al. | |
| 2021/0009088 A1 | 1/2021 | Hayashi et al. | |
| 2021/0197223 A1 | 7/2021 | Menicovich et al. | |

FOREIGN PATENT DOCUMENTS

| | | | | |
|---|---|---|---|---|
| CN | 106150988 A | * | 11/2016 | .............. F04B 39/00 |
| CN | 107795466 | | 3/2018 | |
| CN | 110107487 | | 8/2019 | |
| CN | 110107487 A | | 8/2019 | |
| EP | 2 873 609 | | 5/2015 | |
| EP | 3079034 A1 | * | 10/2016 | .............. G06F 1/20 |
| EP | 3093491 | | 11/2016 | |
| JP | H10-275946 | | 10/1998 | |
| WO | WO 2021/138305 | | 7/2021 | |

OTHER PUBLICATIONS

Van Buren, T., Synthetic Jet Actuator Development and In Depth Exploration, Ph.D. Thesis, Rensselaer Polytechnic Institute, Troy, NY (2013), 239 pages.
International Search Report/Written Opinion issued by the U.S. Patent & Trademark Office as International Searching Authority relative to PCT/US2020/067285 on Mar. 26, 2021; 12 pages.
International Preliminary Report on Patentability Dated Jul. 5, 2022 From the International Bureau of WIPO Re. Application No. PCT/US2020/067285. (11 Pages).
International Search Report and the Written Opinion Dated Mar. 26, 2021 From the International Searching Authority Re. Application No. PCT/US2020/067285. (12 Pages).
Official Action Dated Sep. 23, 2022 From the US Patent and Trademark Office Re. U.S. Appl. No. 17/136,422. (36 Pages).
Official Action Dated Apr. 26, 2023 From the US Patent and Trademark Office Re. U.S. Appl. No. 17/136,422. (69 Pages).
Restriction Official Action Dated Feb. 9, 2022 From the US Patent and Trademark Office Re. U.S. Appl. No. 17/136,422. (6 Pages).
Supplementary European Search Report and the European Search Opinion Dated Dec. 5, 2023 From the European Patent Office Re. Application No. 20910077.5. (8 Pages).
Van Buren "Synthetic Jet Actuator Development and In Depth Exploration", Ph.D. Thesis, Rensselaer Polytechnic Institute, Troy, NY 201., 239 pages. (No Copy Available).
Notification of Office Action and Search Report Dated Jan. 23, 2025 From the State Intellectual Property Office of the People's Republic of China Re. Application No. 202080095148.1 and Its Machine Translation of Office Action into English. (28 Pages).
Communication Pursuant to Article 94(3) EPC Dated Apr. 2, 2025 From the European Patent Office Re. Application No. 20910077.5 (6 Pages).
Notification of Office Action and Search report Dated Jul. 14, 2025 From the State Intellectual Property Office of the People's Republic of China Re. Application No. 202080095148.1 and Its Translation in English (26 Pages).

* cited by examiner

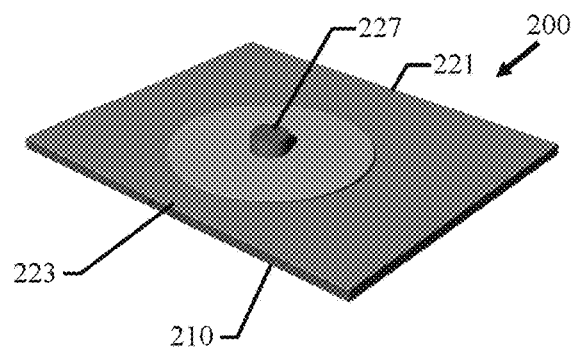
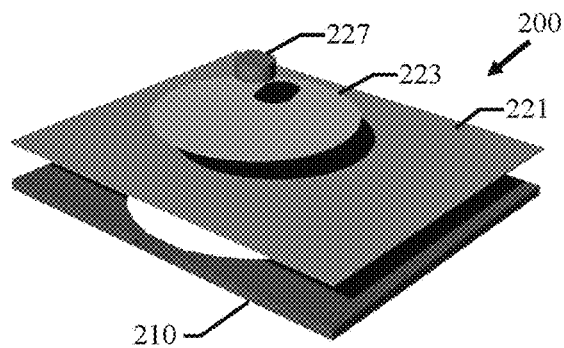
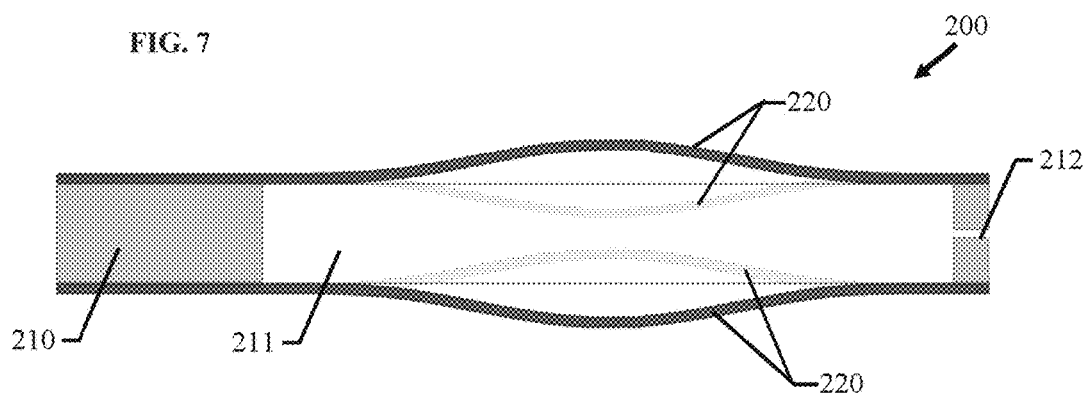
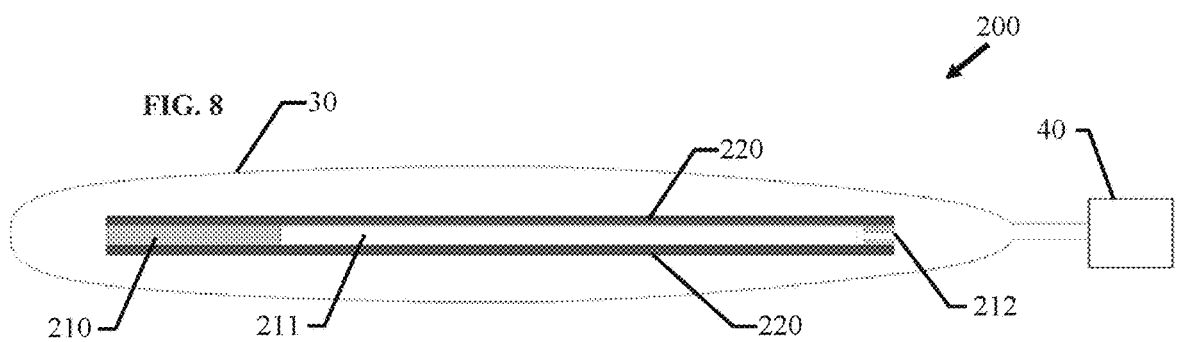

FIG. 11A
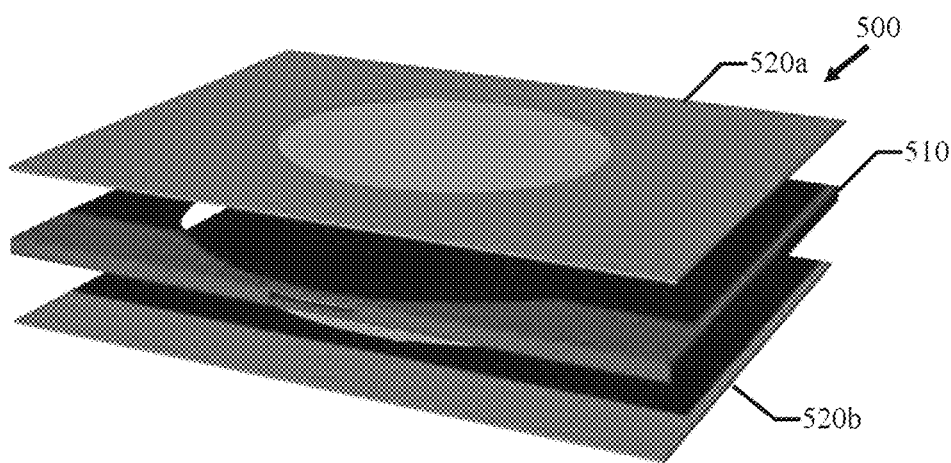
FIG. 11B
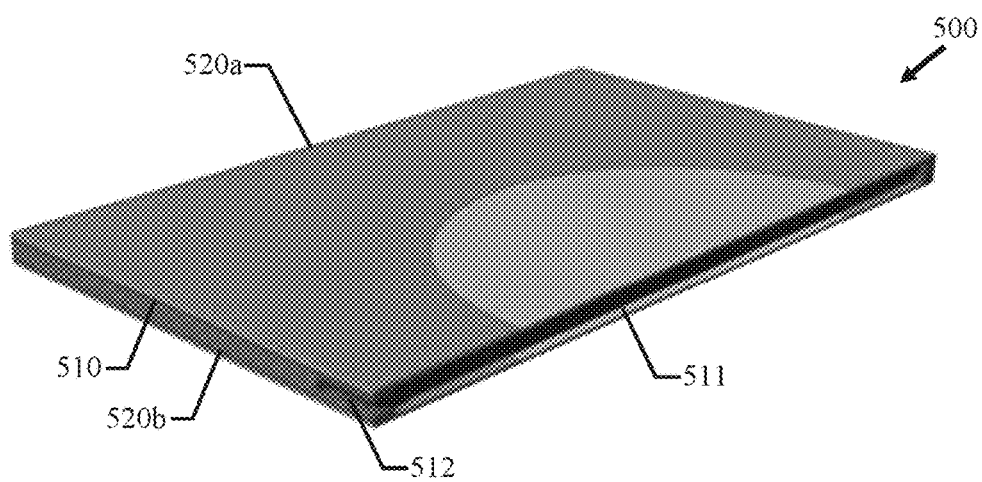
FIG. 11C
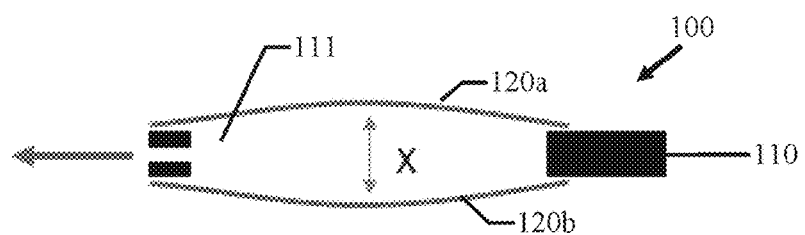
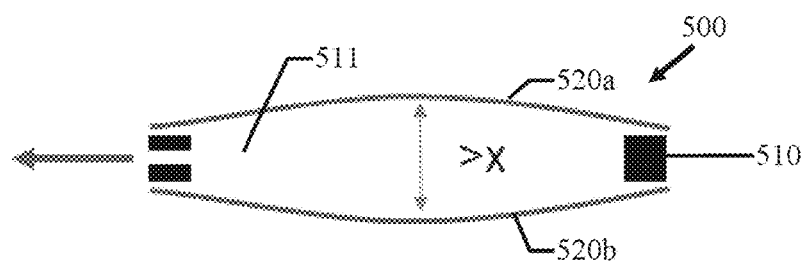

PRODUCTION TECHNIQUE OF SYNTHETIC JET ACTUATORS

FIELD OF THE INVENTION

The present invention relates to synthetic jet actuators and methods of making and using the same. In particular, the present invention is directed to improvements in synthetic jet actuators suitable for use in zero net mass flow applications.

BACKGROUND OF THE INVENTION

Piezoelectric-driven membranes have been used to generate synthetic jets in various active flow control applications such as fatigue reduction on wind turbine blades, electronic cooling, and drag reduction for aerial and ground vehicles. Studies have shown that with these actuators, Active Flow Control (AFC) systems can dramatically change the airflow regime around a bluff body resulting in improved aerodynamic performance.

As one example, when applied to a ground vehicle such as a tractor trailer truck, synthetic-jet-based AFC may create a virtual surface modification, effectively changing the airflow around the vehicle, and thus the aerodynamic drag on the vehicle, without changing the vehicle shape. Although AFC systems are known in academic research, previous attempts to apply the technology to ground vehicles has been limited by high sound levels, low jet speed, and low jet momentum, as well as high power consumption by the actuators.

Conventional AFC systems have included the use of clamped actuators in zero net mass flow (ZNMF) designs. A ZNMF design is one that generates a jet flow through manipulation of a surrounding environment fluid, without requiring an additional fluid supply, such that the jet flow is generated without any change in the net mass of the surrounding environment fluid. To date, however, conventional clamped actuators have been found to have a number of undesirable limitations, including performance limitations, scaling factor limitations, and integration factor limitations.

Nuventix has developed clamped-edge actuators that are optimized for acoustical performance for use in cooling LED lights, however these actuators reach very low jet speeds that are insufficient for applications such as drag reduction in vehicles which instead require high jet speeds. While laboratory testing at Rensselaer Polytechnic Institute suggests clamped-edge actuators may be capable of achieving jet speeds in excess of 200 m/s, such actuators are considered not commercially viable as they require the actuators to be constructed with an excessive size and mass, through complicated assembly methods with poor repeatability and seal-ability, and with the assembled actuators being incapable of fine resonance frequency tuning (e.g., to avoid high decibels) and requiring a high power consumption.

Other attempts at designing actuators for reducing noise levels include modifications to the actuators that prohibit their use in many commercial applications that require high jet velocities, integration into constrained spaces such as a surface of a vehicle, or the use of multiple actuators (an actuator array) operated simultaneously to achieve a desired outcome. One example of an actuator design intended for reducing noise is provided in U.S. Pat. No. 8,564,217, in which noise reduction is achieved for a single actuator for very low jet velocities (<30 m/s) through use of a fixed phase angle that is applicable in the case of an individual actuator, but which is ineffective for use in an array of actuators. Another example is provided in U.S. Pat. No. 8,308,078, in which a synthetic jet actuator is provided with two orifices that are made to face in different directions in order to reduce an overall noise level generated by the jets generated therefrom, though at the expense of limited directional jet velocity and rendering these actuators unsuitable for use in any application in which directional control of the jets is required to include ejecting the jets in a common direction. A further example is provided in European patent no. 2 873 609, in which the actuator is provided with a surrounding muffler that substantially increased the volume of the actuator and effectively prohibits the actuator from use in applications that require integration of the actuator into a confined space (e.g., surface integration applications).

Despite the advances in the art to date, there remains a need for improvements to synthetic jet actuators for yet further advancing the state of the art, and improving the ZNMF designs generally.

SUMMARY OF THE INVENTION

A synthetic jet actuator comprises a first cavity layer comprising an internal cavity for reception of a fluid volume and an orifice providing a fluid communication between the cavity and an external atmosphere; and a first oscillatory membrane comprising a piezoelectric material adapted to deflect the first oscillatory membrane in response to an electrical signal. The cavity has an opening in at least one planar surface of the first cavity layer, and the first cavity layer and the first oscillatory membrane are joined by a high strength, low shear modulus adhesive material with the first oscillatory membrane positioned adjacent to the planar surface having the cavity opening and adapted as an enclosing surface to said cavity opening. The first oscillatory membrane is adapted to compress and expand a volume within the cavity, based on a deflection generated by the piezoelectric material, for generating a fluid flow between the cavity and the external atmosphere through the orifice.

The first oscillatory membrane comprises a substrate that has a high storage modulus and low loss modulus, and a tan delta of less than 0.5. The piezoelectric material joined to the substrate by a bonding material having a high strength, high shear modulus covalent and cohesive bond. The substrate and the bonding material are electrically conductive, and the substrate and the bonding material are adapted to act as an electrical connection for the delivery of an electrical power to the piezoelectric material, with the electrical connection configured to provide a non-uniform spatial coverage on the piezoelectric material for producing an anisotropic deflection of the oscillatory membrane.

The adhesive material joining the oscillatory membrane and the cavity layer comprises at least one of: an adhesive film positioned between the first cavity layer and the first oscillatory membrane, and an adhesive liquid applied to a surface of at least one of the first cavity layer and the first oscillatory membrane. The first oscillatory membrane is positioned such that a central axis of the oscillatory membrane aligns with a central axis of the cavity in the first cavity layer, and such that a central axis of the piezoelectric material also aligns with the central axis of the cavity in the first cavity layer.

The first oscillatory membrane is adapted with a pre-stressed state such that in a non-powered state said oscillatory membrane rests at a neutral axis that provides a slightly expanded state to the cavity of the first cavity layer, and such that the first oscillatory membrane is forced to buckle upon deflecting to a compressed state under power of the piezoelectric material. Preferably, the first oscillatory membrane is adapted with a pre-stressed state of at least 0.01 in.

In some examples, the first cavity layer comprises an expansion chamber embedded within the orifice, the expansion chamber comprising a series of baffles for buffering fluid flows that pass through the orifice. In some examples, a boundary surface of the cavity in the first cavity layer comprises one or more sloped surfaces having a curvature that is predetermined to correspond with a curvature of the first oscillatory membrane in a deflected compression state for minimizing volume within the cavity that is predetermined to correspond with stagnant fluid flow. The actuator is configured to generate jet velocities greater than 50 m/s at resonance frequencies below 500 Hz; and preferably jet velocities in a range of greater than 50 m/s to 100 M/s at resonance frequencies in a range of about 150 Hz to 475 Hz.

In one example, the actuator further comprises a second oscillatory membrane comprising a piezoelectric material adapted to deflect the second oscillatory membrane in response to an electrical signal, with the cavity of the first cavity layer is formed as a through-hole passing through the entire cavity layer, and having two openings at opposite planar surfaces of the first cavity layer. The first oscillatory membrane is positioned adjacent to a first planar surface of the first cavity layer having a first opening of the cavity and is adapted as an enclosing surface to said first cavity opening, and the second oscillatory membrane is positioned adjacent to a second planar surface of the first cavity layer having a second opening of the cavity and is adapted as an enclosing surface to said second cavity opening. Both the first and second oscillatory membranes are adapted to compress and expand a volume within the cavity, based on deflections generated by the respective piezoelectric materials in the separate oscillatory membranes, for generating a fluid flow between the cavity and the external atmosphere through the orifice. The first and second oscillatory membranes are both positioned such that central axes of both respective oscillatory membranes align with a central axis of the cavity in the first cavity layer, and central axes of the piezoelectric material of both respective oscillatory membranes also align with the central axis of the cavity in the first cavity layer.

In another example, the actuator further comprises a second cavity layer comprising an internal cavity for reception of a fluid volume and an orifice providing a fluid communication between the cavity and an external atmosphere; a second oscillatory membrane comprising a piezoelectric material adapted to deflect the second oscillatory membrane in response to an electrical signal; and a third oscillatory membrane comprising a piezoelectric material adapted to deflect the second oscillatory membrane in response to an electrical signal. The cavities in both the first and second cavity layers are formed as through-holes passing through the entirety of the respective cavity layer, both cavities having two openings at opposite planar surfaces of the respective cavity layer. The first oscillatory membrane is positioned adjacent to a first planar surface of the first cavity layer having a first opening of the cavity in the first cavity layer and is adapted as an enclosing surface to said first cavity opening of the cavity in the first cavity layer. The second oscillatory membrane is positioned adjacent to both a second planar surface of the first cavity layer having a second opening of the cavity in the first cavity layer and a first planar surface of the second cavity layer having a first opening of the cavity in the second cavity layer and is adapted as an enclosing surface to both said second cavity opening of the cavity in the first cavity layer and said first cavity opening of the cavity in the second cavity layer. The third oscillatory membrane is positioned adjacent to a second planar surface of the second cavity layer having a second opening of the cavity in the second cavity layer and is adapted as an enclosing surface to said second cavity opening of the cavity in the second cavity layer.

In this example, the first and second oscillatory membranes are adapted to compress and expand a volume within the cavity of the first cavity layer, based on deflections generated by the respective piezoelectric materials in the separate oscillatory membranes, for generating a fluid flow between the cavity and the external atmosphere through the orifice. The second and third oscillatory membranes are adapted to compress and expand a volume within the cavity of the second cavity layer, based on deflections generated by the respective piezoelectric materials in the separate oscillatory membranes, for generating a fluid flow between the cavity and the external atmosphere through the orifice. The second oscillatory membrane is adapted to expand a volume within the cavity of the second cavity layer while concurrently compressing a volume within the cavity of the first cavity layer, and to compress a volume within the cavity of the second cavity layer while concurrently expanding a volume within the cavity of the first cavity layer.

In another example, the actuator further comprises a second cavity layer comprising an internal cavity for reception of a fluid volume and an orifice providing a fluid communication between the cavity and an external atmosphere, with the cavities in both the first and second cavity layers are formed as blind-holes having only a single opening in one planar surface of the respective cavity layers. The first oscillatory membrane is positioned between the first and second cavity layers, adjacent to a planar surface of the first cavity layer having the cavity opening of the cavity in the first cavity layer and adjacent to a planar surface of the second cavity layer having the cavity opening of the cavity in the second cavity layer, and is adapted to compress and expand a volume within the cavity of the first cavity layer, and to compress and expand a volume within the cavity of the second cavity layer. The first oscillatory membrane is adapted to expand a volume within the cavity of the second cavity layer while concurrently compressing a volume within the cavity of the first cavity layer, and to compress a volume within the cavity of the second cavity layer while concurrently expanding a volume within the cavity of the first cavity layer.

Actuators according to the present invention may also comprise an acoustical enclosure provided outside of the first cavity layer and the first oscillatory membrane for containing noise generated by the first oscillatory membrane. The acoustical enclosure comprises an outer shell with an absorbent material and an acoustic barrier positioned within the outer shell, the absorbent material being positioned outside of the oscillatory membrane and the acoustic barrier being positioned outside of the absorbent material.

Actuators according to the present invention may also comprise an acoustic nozzle positioned at an exterior of the orifice of the first cavity layer, and adapted to extend a flow path for fluid flows passing into and out from said orifice. The acoustic nozzle comprises an exterior ring made of an acoustic barrier material, with an acoustic substrate and an acoustic absorbent layer provided within the exterior ring, the acoustic substrate being positioned outside the extended flow path provided to the orifice of the cavity layer, and the acoustic absorbent layer being positioned outside the acoustic substrate. The acoustic nozzle may be a monolithically integral component of the cavity layer, and the flow path provided within the acoustic nozzle comprises a flow expansion chamber.

The present invention is also inclusive of methods of making actuators, comprising steps of forming the oscillatory membrane by joining the piezoelectric material to a substrate; pre-stressing the oscillatory membrane during assembly through heat forming via voltage compression and/or electrically actuating the piezoelectric material; positioning the first oscillatory membrane adjacent to a planar surface of the planar surface of the first cavity layer having the cavity opening and joining the first oscillatory membrane and the cavity layer by an adhesive material; positioning an independent mass structure within the oscillatory membrane, adjacent the piezoelectric material, and securing the independent mass structure in place with a high strength, low shear modulus adhesive; generating a vacuum pressure to apply a uniform atmospheric pressure to press the cavity layer and oscillatory membrane together; and heat curing the cavity layer and oscillatory membrane while apply the uniform atmospheric pressure.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below:

FIG. 2B showing an exploded view of the actuator separating the oscillatory membrane layers from the cavity layer; and FIG. 2C showing a further exploded view of the actuator separating the individual layers of the composite oscillatory membranes;

FIG. 4B showing an exploded view of the unimorph membrane;

FIG. 5B showing an exploded view of the cavity and unimorph membrane layers;

FIGS. 6A-B show schematics of the cavity and unimorph membrane layer assembly in FIGS. 5A-B with an added mass provided to the unimorph membrane, with FIG. 6A showing an assembled view of the cavity and unimorph membrane layers with the added mass; and FIG. 6B showing an exploded view of the cavity and unimorph membrane layers with the added mass;

FIG. 7 shows a schematic of an actuator with prestressed composite oscillatory membranes;

FIG. 8 shows a schematic for assembly of a fully covalently and cohesively bonded actuator as in FIGS. 2A-C;

FIGS. 11A-C show schematics for an example of an actuator according to the present invention having a centrally aligned cavity and oscillatory membranes, with FIG. 11A showing an exploded view of the actuator layers, FIG. 11B showing a cross-sectional view of the assembled actuator, and FIG. 11C showing comparative schematics of off-centered and centered actuator arrangements;

DETAILED DESCRIPTION OF THE INVENTION

Figure 1A:
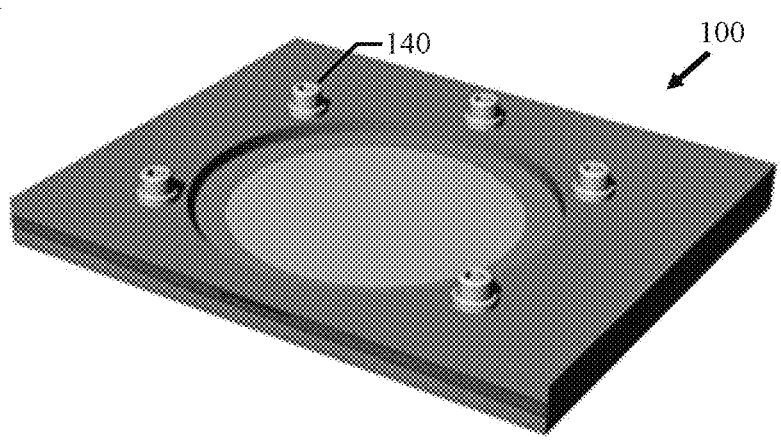
FIGS. 1A-B show schematics of a conventional synthetic jet actuator, with FIG. 1A showing an assembled view of a clamped actuator, and FIG. 1B showing an exploded view of the clamped actuator.

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention, unless made clear in context.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

The word "substantially", as used herein with respect to any property or circumstance, refers to a degree of deviation that is sufficiently small so as to not appreciably detract from the identified property or circumstance. The exact degree of deviation allowable in a given circumstance will depend on the specific context, as would be understood by one having ordinary skill in the art.

Use of the terms "about" or "approximately" are intended to describe values above and/or below a stated value or range, as would be understood by one having ordinary skill in the art in the respective context. In some instances, this may encompass values in a range of approx. +/−10%; in other instances there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

Figure 1B:
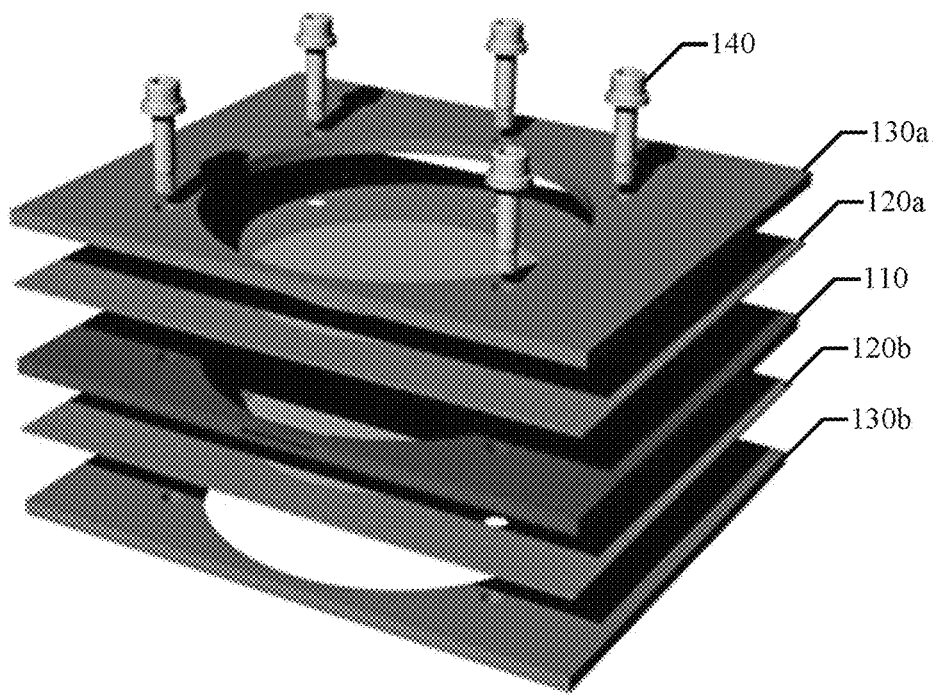

FIGS. 1a-1b show one example of a conventional synthetic jet actuator 100, in the form of a clamped actuator, both in an assembled state (FIG. 1a) and an exploded state (FIG. 1b). In this conventional example, the actuator 100 is shown to include several layers, including a central cavity layer 110; two oscillatory membrane layers 120a/120b; and two outer layers 130a/130b. The several layers in the conventional actuator 100 are held together by a number of clamping elements 140, illustrated in this example by a number of bolts and mating nuts (not shown). Each bolt has a head with a threaded shaft extending therefrom, and the threaded shaft of each bolt is made to extend through a corresponding series of through-holes in the several layers and mated to a respective nut such that the several layers of the actuator 100 are compressed between the nut and the bolt head.

Conventional actuators, such as the actuator 100, have been found to have a number of undesirable limitations, including performance limitations, scaling factor limitations, and integration factor limitations. Performance issues arise as a result of compromised robustness of the several layers in the assembled state, compromised repeatability due to uneven pressure distribution within the cavity layer 110, and inefficiencies due to air leakage of the assembled actuator 100. Scaling factors limitations are realized due to each actuator requiring a manual assembly, with many components required for mechanically fastening the several layers of each actuator. These conventional actuators are also limited by integration factors such as the assembled actuator having an excessive mass that is prohibitive for smaller applications that require positioning of the actuator in a confined space (e.g., an airplane wing, a wind turbine blade, or an automotive body part), due to additional weight that is required by clamping elements and related hardware.

The present invention addresses synthetic jet actuators that employ one or more piezoelectric-driven oscillatory membranes for generating a compressed jet flow, and is inclusive of actuators that are especially suited for integration into aerodynamic surfaces, as required in many commercial applications, and methods of producing such actuators. Stacked layers in actuators according to the present are secured to one another through bonding, such that the resultant actuator is made to be lightweight, small in overall size, and easy to produce in cost and energy efficient processes.

Generally, in a piezoelectric-driven actuator, a voltage is supplied to deflect a piezoelectric along with a corresponding oscillatory membrane for increasing a pressure within a corresponding cavity and forcibly expelling a fluid from the cavity through a shaped orifice. The present invention provides novel material combinations, design features and fabrication techniques to achieve unprecedented performance beyond that made available by conventional actuators, and which allow for optimized performance parameters that were previously thought mutually exclusive from one another, such as aerodynamic performance, acoustical performance, integration into confined spaces, and use of multiple simultaneously acoustically-synchronized actuators.

Synthetic jet actuators according to the present invention are capable of generating synthetic jets with reduced sound levels, without compromising aerodynamic performance of the generated jets. The reduction in sound levels may be achieved in a number of ways, including though not limited to changes in the shape of the actuators and the equipment used to operate them, with unprecedented performance in the reduction of noise levels that overcomes previous approaches while allowing for optimization of further performance parameters.

Systems and methods according to the present invention are proposed for producing synthetic jet actuators based on piezoelectric actuated membranes that overcome limitations of prior conventional systems and methods by being able to maximize jet velocities and momentums while reducing resonance frequencies (e.g., below 500 Hz), minimizing the amount of piezoelectric material, minimizing power and energy consumption, and minimizing overall weight and size of the actuator.

Systems and methods according to the present invention are also proposed for achieving high jet velocities and momentums, while remaining suitable for integration into confined spaces (e.g., surface integration into commercial applications), and achieving compliance with regulatory standards such as those prescribed by the US Federal Motor Carrier Safety Administration (FMCSA) and the European Union.

Figure 2A:
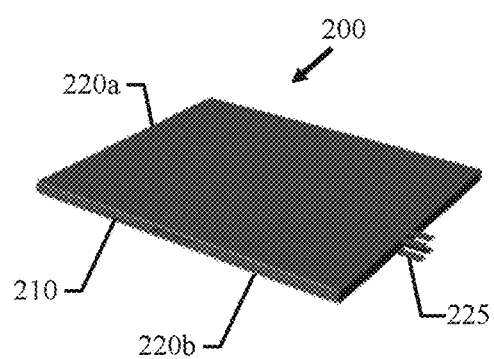
FIGS. 2A-C show schematics of an example of an actuator according to the present invention, with FIG. 2A showing an assembled view of the actuator.
Figure 2B:
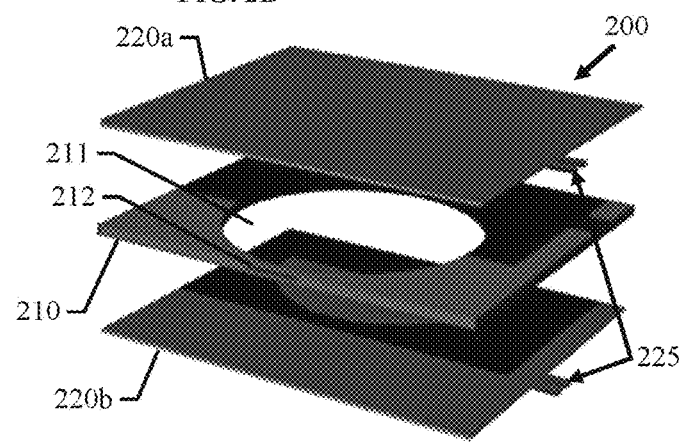
Figure 2C:
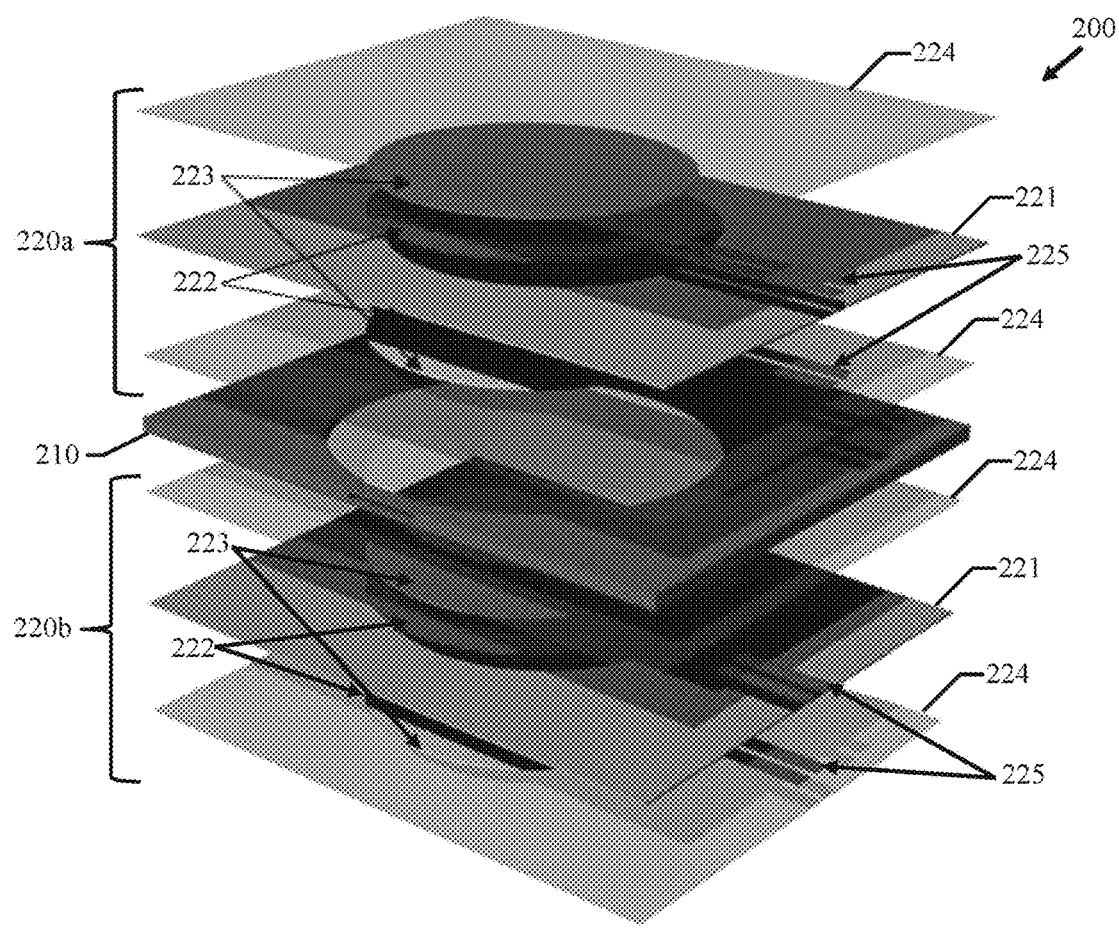

FIGS. 2a-2c show one example of a clampless actuator 200 according to the present invention, with the actuator 200 show in both an assembled state (FIG. 2a) and an exploded state (FIG. 2b); and with FIG. 2c showing further exploded view.

As shown in FIGS. 2a-2b, the actuator 200 comprises a cavity layer 210 that is sandwiched between two composite oscillatory membrane layers 220a/220b. The cavity layer 210 comprises a body having first and second planar surfaces, an outer perimeter, and an inner perimeter, the inner perimeter defining a cavity 211 within the cavity layer 210. The cavity 211 is open to at least one of the two planar surfaces, and may be open to both planar surfaces. When placed adjacent thereto, an oscillatory membrane layer 220 serves as an enclosing surface over an opening to the cavity 211, thereby defining an enclosed space within the cavity 211 for retention of a fluid volume. The cavity layer 211 further comprises an orifice 212 that provides an airflow path between the cavity 211 and an atmosphere external to the actuator 200 for the intake and output of airflows to and from the cavity 211.

As shown in FIG. 2c, both of the oscillatory membranes 220a/220b comprises a substrate 221 that is integrally coupled to a piezoelectric disc 223 through a high strength, high shear modulus covalent and cohesive bond 222. The cohesive bond 222 may be formed by a one or two part thermoset, such as but not limited to a two part epoxy, a one-part methacrylate, or a low melting metal such as a silver solder. In some examples, the cohesive bond 222 may be formed through a thermosetting film adhesive or "prepreg". In some examples, as will be discussed in further detail hereafter, the cohesive bond 222 may be electrically conductive. Both of the oscillatory membranes 220a/220b further include outer layers 224 that enclose and secure the several layers of the respective membrane 220 in place.

In use, the piezoelectric disc 223 is operable through supply of an electrical power from a power source 226 (see FIG. 3) via an electrical connection 225. Supply of an electrical power to the piezoelectric disc 223 causes the disc to deform, and because of the integral coupling of the disc 223 to the substrate 221, deformation of the disc 223 causes a corresponding deflection of the substrate 221 in the same direction. Preferably, the substrate 221 is formed with a material that is substantially thin, has a high storage modulus, and has a minimum loss modulus that results in a minimized tangent of delta (tan delta). Ranges for these parameters, along with preferred values thereof, are provided in Table I.

In some examples, the substrate 221 may be a metal, such as but not limited to steels, aluminum, titanium, brass, copper, or the like, including alloys of the same. In some examples, the metal may be selected from grades that are corrosion resistant, such as but not limited to stainless steels. The metal may also be modified to provide further corrosion resistance or enhanced bond strengths through the use of surface treatments, such as but not limited to, solvent cleaning, abrasion, acid etching, caustic treatments, electroplating, as well as combinations of the same. The surface may also be treated with high energy processes such as flame, corona, plasma, or electrical arc. In one preferred embodiment, the substrate is 0.005" 6061 aluminum that has been cleaned with acetone, abraded with 120 grit alumina, and chromic acid etched prior to bonding to the piezoelectric.

In some examples, the substrate 221 may comprise a high modulus polymer, filled polymer, or fiber-reinforced polymer. These polymers may include thermoplastics or thermosets and may comprise solids such as but not limited to particles, hollow microspheres, nanocomposites, clays, fibers, or flakes, of polymers, metals, or minerals including but not limited to glass, talc, carbon and graphite. The fibers may be chopped fibers, discontinuous fibers, short or long, or continuous, woven, non-wovens, or random oriented mat. Examples of suitable fibers include, though are not limited to: fiberglass, e-glass, s-glass, cr-glass, carbon fiber, low modulus carbon, medium modulus carbon, high modulus carbon, polyethylene, polypropylene, nylon, polyester, aramid, Kevlar, PPS, and combinations thereof. The fiber-reinforced matrix may also be produced from a "pre-preg".

The substrate 221 may comprise multiple layers, with each of the layers chosen independently from the disclosed materials herein, with the different layers having independent fiber orientations. The fiber laminate may be balanced or unbalanced, symmetric or asymmetric. The polymer matrix may include thermosets or thermoplastics, including but not limited to epoxies, urethanes, polyesters, vinyl esters, PPS, polypropylene, PTFE, Teflon, polyethylene, or phenolics. The matrix may be further modified with tougheners, flexibilizers, wetting agents, defoamers, Tg enhancers, materials with densities greater than 2.6 g/cm3, or other materials known by those skilled in the art of composite materials. In one preferred embodiment, the substrate is a preformed 0.005" 0/90 woven laminate of glass in amine-cured epoxy matrix that is solvent cleaned with isopropanol, and abraded with 220 grit sandpaper, and dry wiped prior to bonding the piezoelectric disc.

In some examples, the piezoelectric disc 223 may be covalently bonded to the substrate 221 during fabrication of the substrate 221, with may be performed through processes including but not limited to injection molding, overmolding, thermoforming, heat scaling, RTM, VARTM, SCRIMP, vacuum bagging, autoclave processing, or wet lay-up. In one preferred embodiment, the piezoelectric disc 223 is placed on a square woven 7 oz e-glass mat wet-out with an amine-cured epoxy. Vacuum bagging techniques may be used to apply even pressure application during an elevated temperature cure during which time the disc 223 is integrally bonded to the substrate 221 as the substrate is formed.

As shown in FIGS. 2a-2c, the layered composite oscillatory membranes 220 may comprise one or more outer layers 224, positioned outward of the piezoelectric disc 223. Previously, conventional actuators have used low modulus outer layers or no layer at all, as it has been conventional wisdom that a high modulus layer bonded to the piezoelectric disc, but off of the neutral bending axis, could not be used as it would prevent or inhibit deflection of the membrane. Surprisingly however, it has been found that with the present invention, use of a high modulus outer layer 224, which may be formed of a material substantially similar to the substrate 221, such as a thermoplastic, thermoset, or metal, can lead to unexpected increases in jet velocity. While not being bound by theory, it is believed that coupling of the piezoelectric disc 223 to the substrate 221 at the edge of the disc 223 increases the coupling to the substrate 221, which also increases deflection of the substrate 221. In one preferred embodiment, one or more outside layers 224 is provided in the form of a 7 oz, square-woven, fiberglass in a cycloaliphatic amine-cured epoxy laminate.

Figure 3:
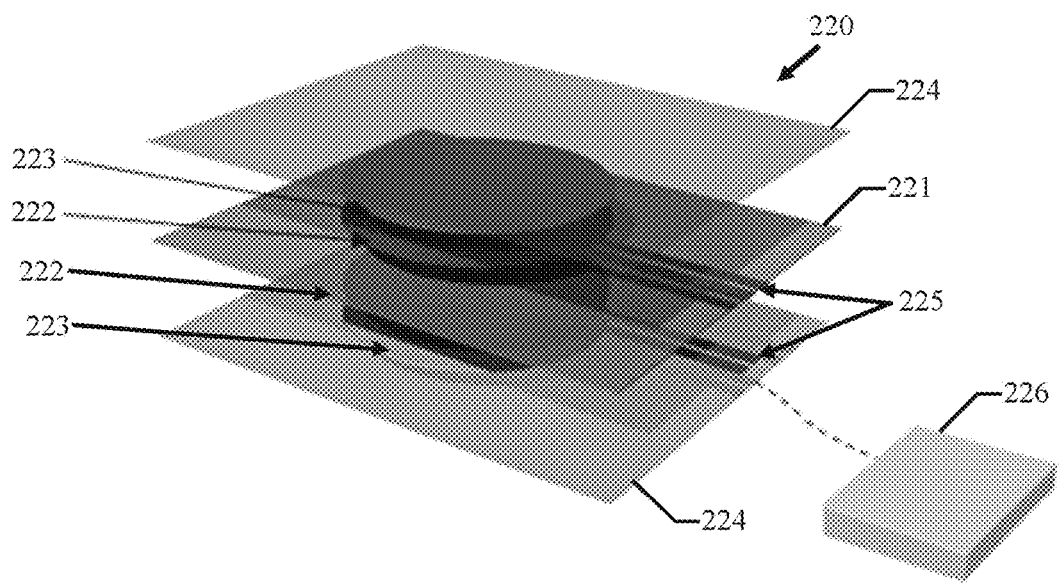
FIG. 3 shows a schematic of an exploded view of an oscillatory membrane in FIG. 2C, in connection with a power source.

FIG. 3 shows an exploded view of a single composite oscillatory membrane 220. As illustrated in this example, the piezoelectric disc 223 is made to deform through supply of an electrical power via the electrical connection 225, which is illustrated in this example in the form of an electrode provides an electrical communication between a power source 226 and a surface of the piezoelectric disc 223. Suitable examples of an electrical connection include, through are not limited to: wires, ribbons, tapes of conductive metals, fibers, as well as stenciled, silk screened, or printed circuits. In some examples, the substrate 221 may comprise a conductive material such as a metal or carbon fiber that serves the dual role as an electrode and a mechanical component of the layered composite membrane.

The electrical connection 225 may connect to the surface of the piezoelectric disc 223 at any location and over any percentage thereof. In some examples, the electrical connection 225 may connect only to the edge or the middle of the piezoelectric disc 223; in other examples the electrical connection 225 may be shaped as a ring, or may be spiral shaped to reduce bending strains thereon. The electrical connection 225 may further comprise a conductive pressure sensitive adhesive, methacrylate, filled thermoset, solder, or a conductive veil such as a metal-coated nonwoven or wire mesh, or an anisotropic electrically conductive adhesive film (ACF). In a preferred embodiment, the electrical connection 225 comprises a ⅛" wide copper tape with an electrically conductive pressure sensitive adhesive (PSA). In another preferred embodiment, the electrical connection 225 comprises a Ni or Cu-coated carbon veil having an aerial weight of 20 g/m2, such as those supplied by Technical Fibre Products. The surface of the piezoelectric disc 223 may also comprise a conductive layer that may be thin with a low bending stiffness, such as but not limited to nickel plating or copper cladding. In some examples, the piezoelectric disc 223 may have a nickel surface deposited at 20 micron thickness.

In one preferred embodiment, the electrical connection 225 may be designed so as to intentionally provide non-uniform spatial coverage on the piezoelectric disc 223. The non-uniform coverage, combined with electrical resistance from the surface of the piezoelectric disc 223, produces an anisotropic deflection of the oscillatory membrane 220 that is non-uniform in both time and position. By careful selection of the orientation of the electrical connection 225 and the surface resistance of the piezoelectric disc 223, unexpected improvements in jet velocity may be observed. In a preferred embodiment, a ⅛" copper tape, running perpendicular to the orientation of the orifice 212, is connected to the Ni-sputtered surface of the piezoelectric disc 223 using a conductive PSA, wherein the PSA has a resistance of less than 2 ohm across the connection, but the surface of the electrode has a resistance of 10-40 ohm per inch away from the copper ribbon. Supply of power to the copper tape causes deflection to originate along the central axis of the piezoelectric disc 223 with the highest amplitude, though, due to resistive losses across the surface of the disc 223, the amplitude decreases as it approaches an edge thereof. This induces a partial wave shape to form in the piezoelectric disc 223, and the oscillatory membrane 220 as whole, thereby directing a fluid in the cavity 211 towards the orifice 212 and generating jet velocity increases of up to 5%. In addition, the reduction in the actuation of the piezoelectric disc 223 near the periphery thereof reduces the strain in the transition of the materials, which has been found to result in significant improvements to the longevity of the disc 223.

Figure 4A:
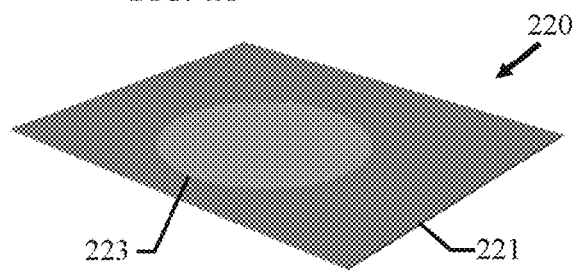
FIGS. 4A-B show schematics of a unimorph assembly of an oscillatory membrane in the actuator of FIGS. 2A-C, with FIG. 4A showing an assembled view of the unimorph membrane.
Figure 4B:
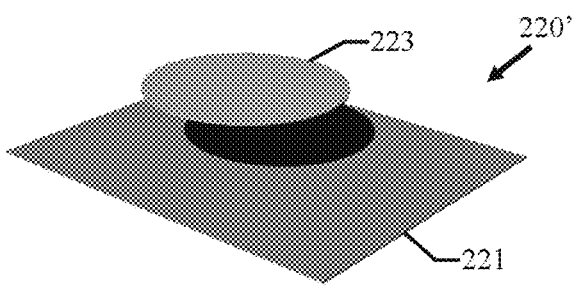

Piezoelectric materials are well known to those skilled in the art and may be selected from a group including but not limited to PZT, quartz, zinc oxide, PVDF, barium titanate, or the like. Because these materials are relatively expensive, there is interest in limiting the amount of material used in the oscillatory membrane 220. In some examples, a reduction in piezoelectric material may be achieved through use of relatively thin piezoelectric discs 223 between 0.01 and 0.1" thickness, with inclusion of only one piezoelectric disc 223 per oscillatory membrane 220. An oscillatory membrane using only a single piezoelectric disc 223 may be referred to as a unimorph. FIGS. 4a-4b show one example of a unimorph membrane 220'—for ease of illustration, the illustrated example foregoes depiction of the adhesive bond 222 and outer layers 224.

Figure 5A:
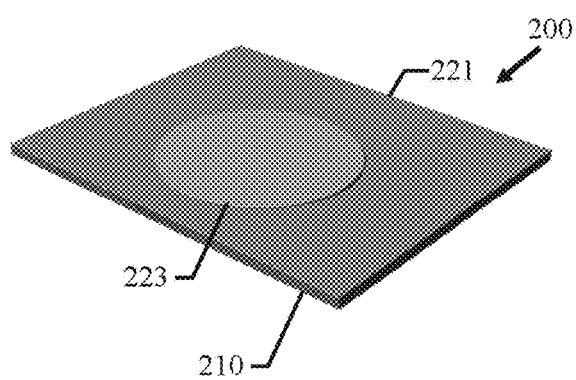
FIGS. 5A-B show schematics of an assembly of the unimorph membrane in FIGS. 4A-B with a cavity layer, with FIG. 5A showing an assembled view of the cavity and unimorph membrane layers.
Figure 5B:
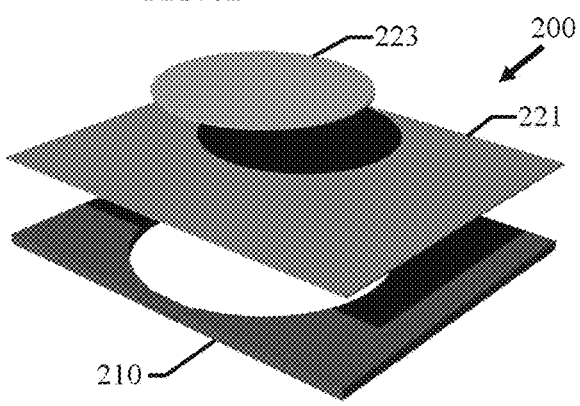

By using only a single piezoelectric disc 223, a unimorph membrane 220' has an advantage of reduced power and energy consumption, as well as a lower resonance frequency. In a unimorph membrane 220', the piezoelectric disc 223 may be placed on the neutral bending axis of the oscillatory membrane, as shown in FIGS. 4a-4b, inside or outside the cavity 211 of the cavity layer 210. In a preferred embodiment, the unimorph membrane 220' is designed such that the single piezoelectric disc 223 is on the side of the substrate 221 opposite the cavity 211. FIGS. 5a-5b show one such example of a unimorph membrane 220' as assembled in an actuator 200 that employs only a single oscillatory membrane 220, with the piezoelectric disc 223 of the single unimorph membrane 220' positioned on an outside surface of the substrate 221, opposite the cavity 211. Again, for ease of illustration, the illustrated example foregoes depiction of the adhesive bond 222 and outer layers 224.

In some examples, deflection and resonance frequency of the oscillatory membrane 220 may be further turned through the use of high density materials. Through empirical study, it was discovered that increasing the mass of the oscillatory membrane 220, without significantly changing other mechanical properties, can dramatically change the response of the membrane 220. Such an increase in mass may be achieved by inlaying high density materials, such as tungsten, into the substrate 221, or by forming the substrate 221 substantially of tungsten. In other examples, the added mass may be achieved by filling the thermoplastic and thermoset of the composite oscillatory membrane 220 with high density materials, such as barium sulfate. In some examples, an additional independent mass structure may be incorporated into the composite oscillatory membrane 220. FIGS. 6a-6b illustrate one example of an actuator 200 in which a 5 oz lead disc 227 is attached to the center of the outside surface of the piezoelectric disc 223 with a high strength, low shear modulus adhesive (not shown). Because of the location of attachment and low shear modulus of the adhesive, the piezoelectric disc 223 is still allowed to bend freely, while the added mass 227 decreases resonance frequency by 40% without significantly affecting jet velocity.

While not being bound by theory, it is believed that an added mass increases the momentum of the oscillatory membrane 220, causing greater displacement as it is cyclically powered. In addition, the increase in weight causes both a decrease and broadening of the resonance frequency. This is especially beneficial in the use of net zero mass flow clampless actuators in aerodynamics applications, including tractor trailer trucks, as the market requires a resonance frequency of less than 500 Hz. By increasing the mass of the oscillatory membrane 220, it is possible to decrease and broaden the resonance frequency from 800 Hz down to frequencies within a range of about 150 to about 475 Hz.

Buckling actuators are well known to those skilled in the art. In designs according to the present invention, a non-powered oscillatory membrane 220 rests at a neutral bending axis that results in a slight expanded state as illustrated in FIG. 7. When powered, the oscillatory membrane 220 is forced to buckle and snap to an opposite side from the neutral bending axis, which is expected to reduce resonance frequency while increasing the force in which the membrane acts against the air inside the cavity, resulting in higher jet velocity values (compared to a non-buckling actuator of similar size) at lower sound level (reduction in actuation frequency equates to lower sound levels).

As an alternative to conventional mechanical displacement as a means for pre-stressing, the present invention is inclusive of a voltage compression may be used to displace the oscillatory membrane 220 through heat forming by raising a temperature of the membrane 220 above its softening or melting point, deforming it, and then cooling it in the deformed state. Heat forming may be done before or after assembly of the actuator. In some examples, an actuator may be made with a variable displacement by assembling the actuator using mechanically fastened plates, such that the fasteners may enable the membrane to be repeatedly displaced or repositioned, and then clamped, in order to fine tune performance metrics.

Buckle geometry of the actuator 200 may be optimized by electrically actuating the piezoelectric disc 223 during assembly of the actuator. An actuated piezoelectric disc 232 will deform to its desired geometry, thus by actuating the piezoelectric disc 223 during assembly of the actuator the assembled actuator 200 will be pre-optimized for combination of the specific piezoelectric disc 223 and substrate 221. Control of the static voltage can further fine tune the buckled shape and performance parameters.

The present invention is inclusive of methods of fabricating oscillatory membranes 220, as well as actuators 200 that incorporate such membranes, to produce synthetic jet actuators that have fully cohesively and covalently bonded structures with uniform bond strength and minimized internal stresses.

Prior approaches to assemble zero net mass flow clamped edge piezoelectric-driven synthetic jet actuators have relied on mechanical clamping. Those conventional approaches have a downside of increasing the number of parts and assembly steps, presenting a possibility of leaks through interfaces, as well as increased mass and volume, and the further potential for mechanical failure due to the loosening of fasteners overtime while the actuator is in service. Non-mechanical approaches that have been explored include injection molding, over-molding, or hot pressing. While these techniques boast high throughput, the use of high thermal stresses and non-uniform pressures have been found to result in actuators with in-situ strains and poor repeatability. Other approaches have included the use of liquid adhesives, though these have been found to not allow for tight control of bond lines and present a risk fouling in small design features, such as the orifice 212 in the cavity layer 210.

The present invention avoids the downsides of the prior approaches by instead adopting a novel use of a B-staged thermosetting adhesive film and vacuum bag processing to produce actuators with tight control of bond lines and spatially even inter-laminar bond strengths that improve jet performance, reduce complexity, lower overall weight, and improve part-to-part consistency.

Assembly of one or more oscillatory membranes 220 to a cavity layer 210 may include surface preparation of the layer faces, as previously described. In one embodiment, a B-staged thermosetting adhesive film is cut or punched from sheet stock and placed between the membrane and cavity layers 220/210. The film adhesive may also be applied as a liquid to either one or both layers, and B-staged prior to assembly. The film adhesive may also be provide in the same form as the cohesive/adhesive bond 222. As shown in FIG. 8, the several layers are then sealed in a bag 30 that is connected to a vacuum source 40 that removes air from the bag 30 to thereby apply an atmospheric pressure evenly over the surface of the layered components. As opposed to prior approaches that use hot pressing, which produces point loads on small features and misalignments, use of a vacuum-based atmospheric pressure assures a perfectly uniform lamination of the layers and greatly reduces capital costs by not requiring expensive molds. Numerous vacuum bags 30 may be assembled and loaded into a process oven where the temperature is raised, causing the film adhesive to briefly reflow and form cohesive covalent bonds between the layered components before curing.

The layered components may be cured for a period of about 1 hour to about 4 hours, at a temperature in a range of about 140° F. to about 350° F., for the thermoset to reach full properties. In a multi-step assembly, the maximum cure temperature may be saved for the final step in order to "co-cure" all the layers of the composite actuator. Examination of bond lines after such curing has been found to yield control of the adhesive flow to within a 0.030" precision. It has also been found that actuators fabricated under such conditions are capable of increased jet velocities that are up to 25% greater than those generated by mechanical fastened actuators.

While not being bound by theory, it is believed that methods according to the present invention, with a high modulus bond greater than about 8,000 PSI, provide a greater and more spatially uniform interface of the oscillatory membranes to the cavity than is achieved with mechanical fasteners, while also eliminating leak paths. The inventive methods also provide significant weight, cost, and parts savings by not requiring outside clamps, allowing these net zero mass flow clampless actuators to be used in practical applications including improving aerodynamics of tractor trailer trucks.

Certain materials, especially those which are corrosion resistant and intrinsically unreactive, may be difficult to covalently bond with thermosets. These may include materials such as stainless steels, aluminum, or polypropylene. If desired, a "tie-layer" may be used in place of the thermoset to achieve similar results. A "tie layer" is usually one or a combination of two or more mutually compatible materials that form a bonding layer between two mutually incompatible materials. Tie layers may include, for example, a thermoplastic material that provides adhesion to two adjacent materials, most often through melt processing or chemical reactions; modified acrylic acid, or anhydride grafted polymers or those similar to but not limited to DuPont's Bynel, Nucrel, and Fusabond grades, or those described and referenced, as further examples, in U.S. Pat. Nos. 8,076,000; 7,807,013; and 7,285,333. The melting point or melt index of the tie layer may be selected so that the tie-layer can be post-processed without substantially melting or flowing other non-metallics in the rest of the actuator.

Methods according to the present invention, including the use of one or more of non-uniform electrodes, high modulus outer layers, covalent-cohesive bonding, vacuum bagging, and careful control of substrate thickness, storage, and loss moduli, as well as mass distribution, are effective for producing synthetic jet actuators that are capable of overcoming the limitations of prior designs, including the generation of jet velocities greater than 100 m/s at frequencies under 500 Hz, with size and weights that are viable for practical applications, as detailed in Table I below.

TABLE I

| Parameter | Units | Range | Preferred |
|---|---|---|---|
| Substrate Storage Modulus | KSI | 10-30000 | 1000 |
| Substrate Tan Delta | E'/E" | <5 | 0.5 |
| Substrate Thickness | Inch | 0.001-0.060 | 0.005 |
| Piezoelectric Thickness | Inch | 0.002-0.200 | 0.010 |
| Number of Piezoelectrics Per Membrane | Each | 1-4 | 2 |
| Piezo Surface Resistivity | Ohm | 1-100 | 20 |
| Number of Membranes Per Orifice | Each | 1-2 | 1.5 |
| Number of Orifices Per Actuator | Each | 1-2 | 2 |
| Mass of Added Weight (Membrane Excluding Substrate, Electrode, and Disc) | g | 1-500 | 15 |
| Actuator Cross-Sectional Area | in$^2$ | 1-16 | 10 |
| Actuator thickness | in | 0.1-1 | 0.25 |
| Actuator Weight | g | 10-500 | 30 g |
| Jet Velocity | m/s | >50 | 100 |
| Resonance Frequency | Hz | 1-500 | 200 |
| Consumed Power | W | 0.1-40 | 5 |
| Prestressed Displacement | Inch | 0-0.06 | 0.010 |
| Sound pressure level at 1 m away from actuator | dBA | 10-50 | 20 |

Figure 9A:
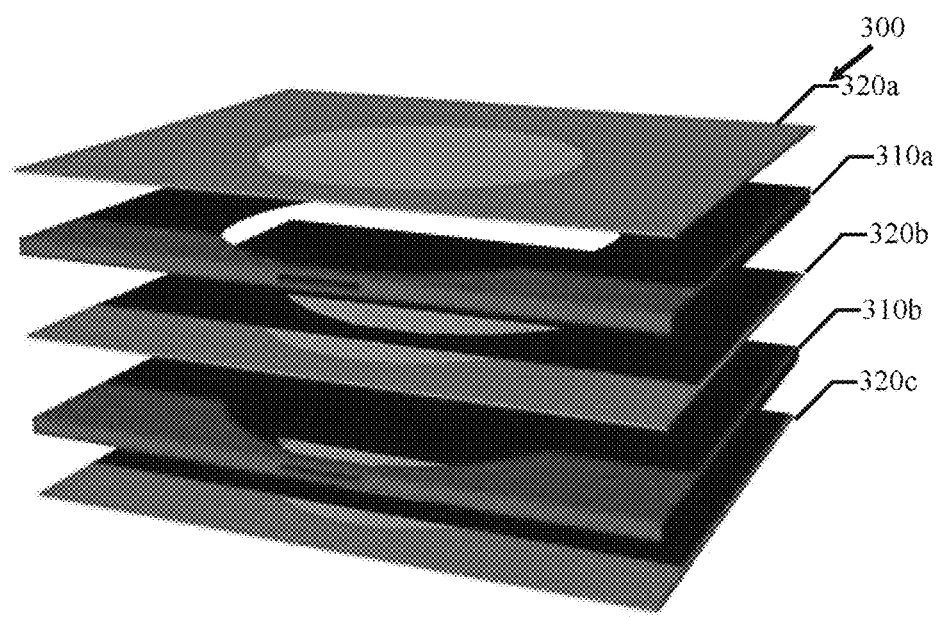
FIGS. 9A-C show schematics for an example of an actuator according to the present invention having two cavities for noise reduction, with FIG. 9A showing an exploded view of the actuator layers, FIG. 9B showing a cross-sectional view of the assembled actuator, and FIG. 9C showing an operational schematic showing action of the oscillatory membranes in the actuator.
Figure 9B:
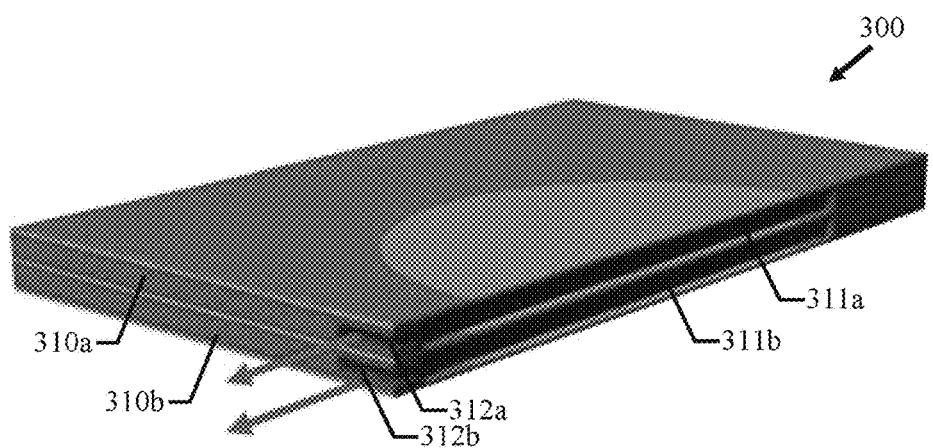
Figure 9C:
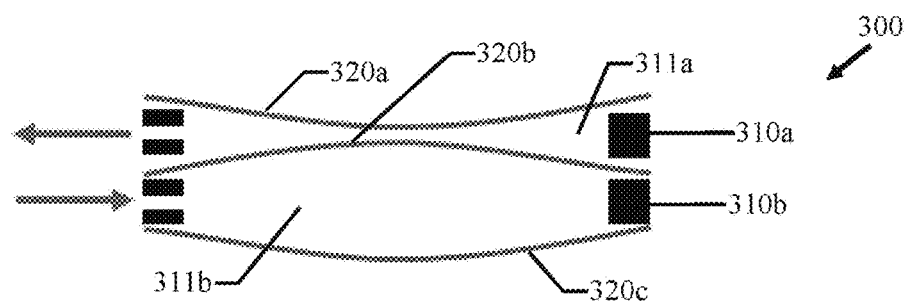

The present invention is inclusive of additional designs for synthetic jet actuators, including designs that incorporate multiple cavity layers with one or more oscillatory membrane arrangements (which may include unimorph membranes), including arrangements in which a common oscillatory membrane is shared between two cavity layers, as well as arrangements that include additional noise reduction elements FIGS. 9a-9c show one example of a synthetic actuator 300 composed of a laminated stack of layers that comprises three oscillatory membranes 320a/320b/320c and two cavity layers 310a/310b, with each cavity layer 310 having a separate cavity 311 and orifice 312. As shown in FIG. 9c, the several layers are stacked such that the two cavity layers 310a/310b cyclically share a common oscillatory membrane 320b that switches between a first mode in which it compresses a volume in the top cavity 311a and expands a volume in the bottom cavity 311b, and a second mode in which it expands a volume in the top cavity 311a and compresses a volume in the bottom cavity 311b. In this way, the actuator 300 is adapted such that airflows at the two orifices 312a/312 are always in opposite directions to one another.

As one skilled in the art will understand, a noise level generated by a synthetic actuator is a function of soundwaves generated by airflows that travel out from and into an orifice of the actuator. With the arrangement shown in FIG. 9c, because the airflows are travelling in opposite directions to one another, sound waves generated by the individual airflows will be inverted relative to one another such that there is an interference generated therebetween, resulting in a partial cancellation of the sound waves and thus a reduction in overall noise levels. Acoustic testing of an actuator with a three oscillatory membrane design as shown in FIGS. 9a-9c was found to result in a 14.7 dB reduction in sound power level as compared to that produced by an individual synthetic jet actuator. Advantageously, as both orifices 312a/312b face in a common direction, the reduction in noise level is achieved with insubstantial loss to aerodynamic performance. Additional parameters of a preferred embodiment of the actuator 300 are provided below in Table II.

Figure 10A:
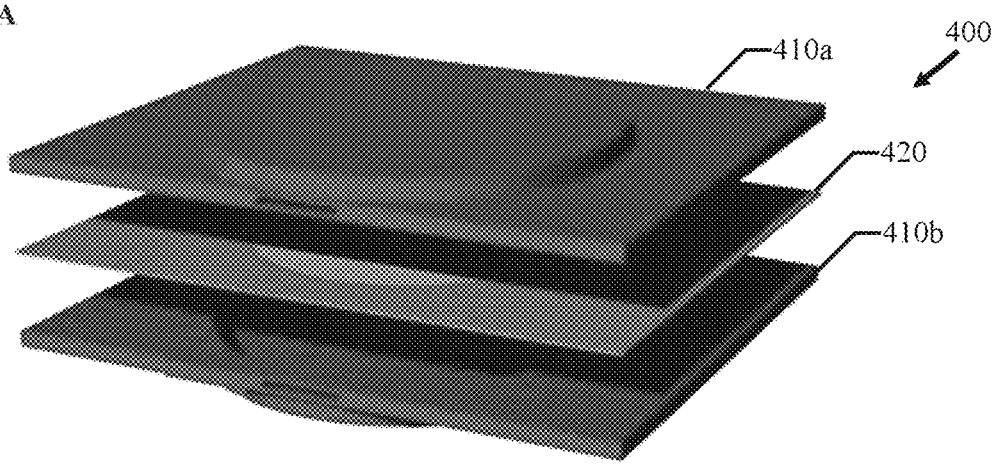
FIGS. 10A-C show schematics for another example of an actuator according to the present invention having two cavities for noise reduction, with FIG. 10A showing an exploded view of the actuator layers, FIG. 10B showing a cross-sectional view of the assembled actuator, and FIG. 10C showing an operational schematic showing action of the oscillatory membrane in the actuator.
Figure 10B:
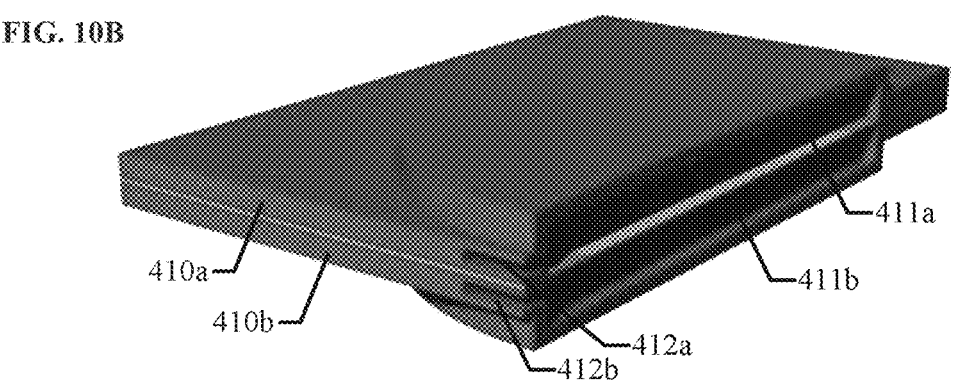
Figure 10C:
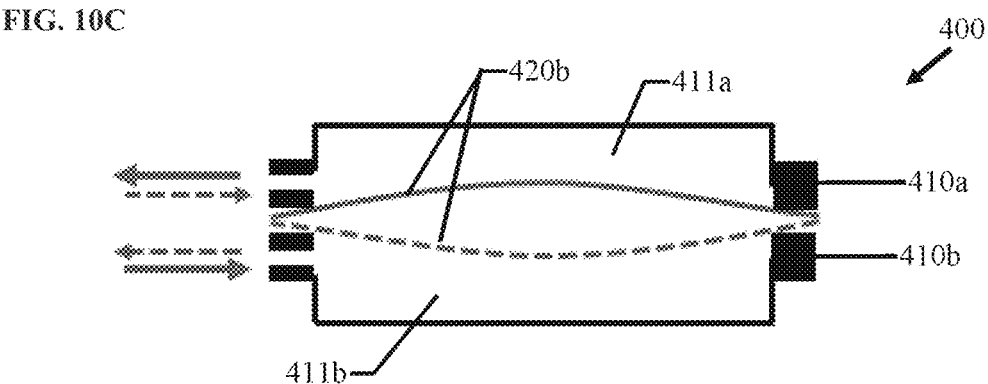

FIGS. 10a-10c show another example of a synthetic actuator 400 composed of a laminated stack of layers that comprises two capped cavity layers 410a/410b each having a cavity 411a/411b and an orifice 412a/412b, and a middle piezoelectric oscillatory membrane 420. As shown in FIG. 10c, the actuator 400 is adapted for the two cavity layers 411a/411b to cyclically share the common oscillatory membrane 420 such that airflows at the two orifices 412a/412b are always in opposite directions to one another, and such that there is an interference between sound waves generated by the two airflows that results in noise reduction. In this example, use of a single oscillatory membrane 420 reduces cost and power consumption. Additional parameters of a preferred embodiment of the actuator 400 are provided below in Table II.

FIGS. 11a-11c show a further example of a synthetic actuator 500 composed of a laminated stack of layers that comprises two oscillatory membranes 520a/520b and a single cavity layer 510 having a cavity 511 and an orifice 512 As opposed to a mechanically fastened actuator, in which fastening elements (e.g., screws, bolts, etc.) are located around the cavity 511 and limit the cavity volume, use of lamination in the actuator 500 enables a significantly larger cavity volume as well as an alignment between a central axis of the oscillatory membranes and a central axis of the cavity 511.

As seen in the comparison shown in FIG. 11c, whereas a conventional clamped actuator 100 will have a cavity 111 with a central axis that is offset from a central axis of the oscillatory membranes 120a/120b, an actuator 500 according to the present invention is provided with additional space for central positioning of the cavity 511 such that a central axis of the cavity will align with a central axis of the oscillatory membranes 520a/520b. Because piezoelectric discs are positioned at centers of the oscillatory membranes 520a/520b, alignment of the cavity central axis and the membrane central axis will also result in a concurrently alignment with the piezoelectric discs. This alignment of the cavity 511 with a larger volume with the central axis of the oscillatory membranes 520a/520b and the centered piezoelectric discs enables a larger displacement of the membranes 520a/520b, which results in a greater jet volume as well as a reduced resonance frequency. Additional parameters of a preferred embodiment of the actuator 500 are provided below in Table II.

Figure 12A:
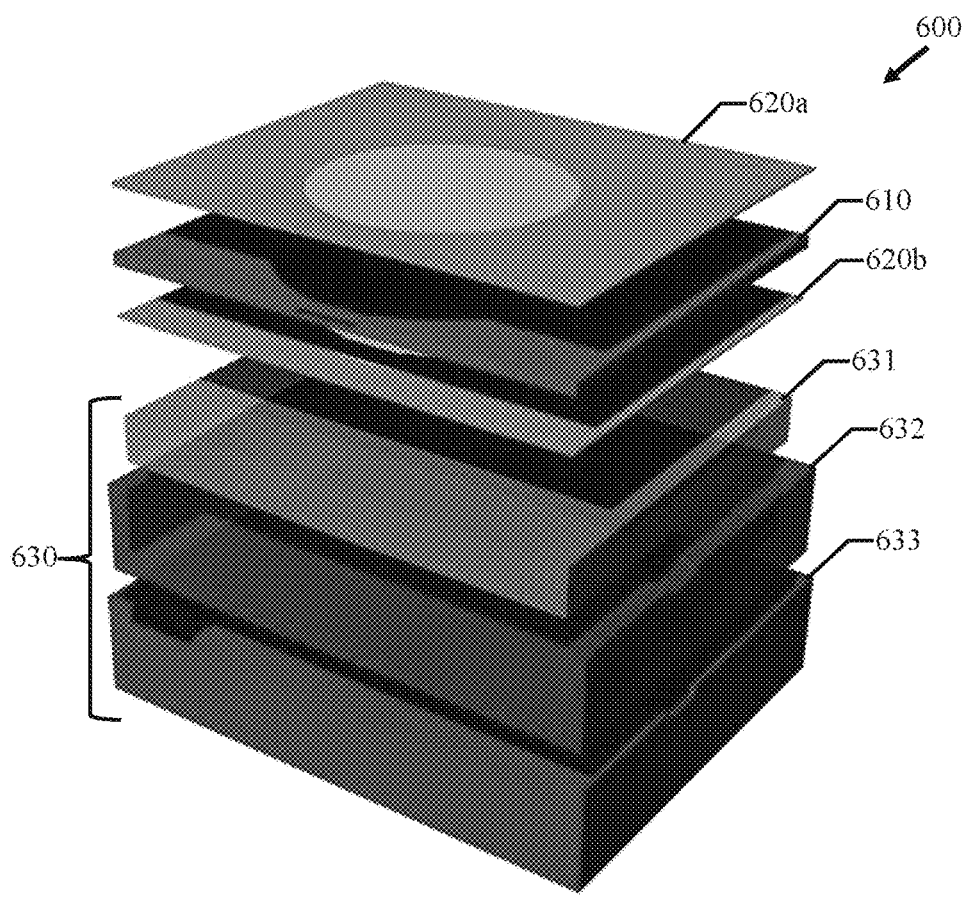
FIGS. 12A-B show schematics for an example of an actuator according to the present invention having a composite acoustical enclosure for side-based noise reduction, with FIG. 12A showing an exploded view of the actuator layers, and FIG. 12B showing a cross-sectional view of the assembled actuator.
Figure 12B:
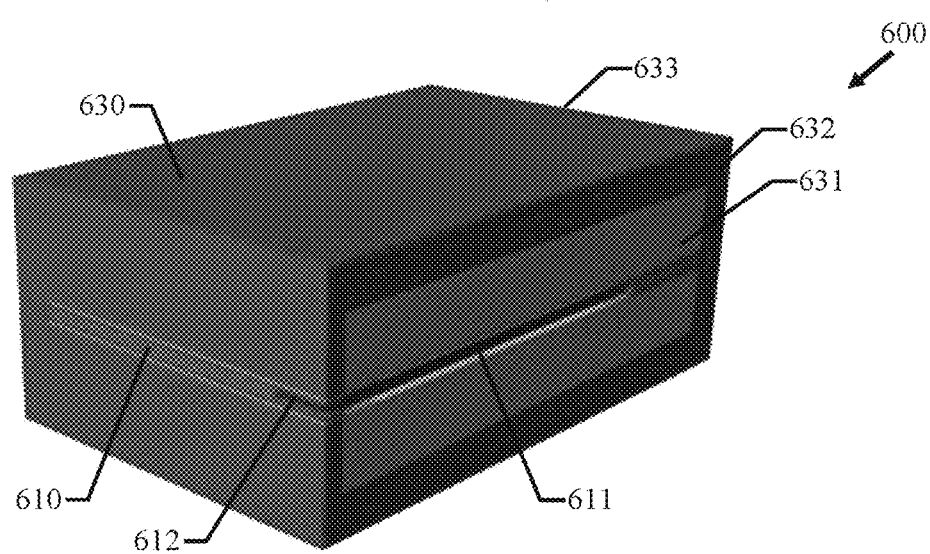

FIGS. 12a-12b show a further example of an actuator 600 that is composed of a laminated stack that comprises two oscillatory membranes 610a/610b and one cavity layer 610 having a cavity 611 and an orifice 612. On each side of the actuator 600, an acoustical enclosure 630 is provided for containing noise generated by each oscillatory membrane 620. The enclosure 630 has a minimum volume that avoids inhibiting performance of the actuator 600. Generally, as the frequency decreases by a ⅓ octave the enclosure volume is doubled. The volume of the enclosure 630 on each side of the actuator 600 scaled section is about 40 times the volume of air moved by each piezoelectric disc during actuation. This volume is filled with an acoustic absorbent material 631 such as melamine foam, fiberglass insulation, or mineral wool material to increase the apparent volume and lower the resonant frequency. Surrounding the absorbent material 631 is an acoustic barrier 632 such as mass loaded vinyl. Both materials are enclosed in an outer shell 633. These materials have transmission loss (TL) values of about 24 at 360 Hz and about 29 at 675 Hz. Additional parameters of a preferred embodiment of the actuator 600 are provided below in Table II.

Figure 13A:
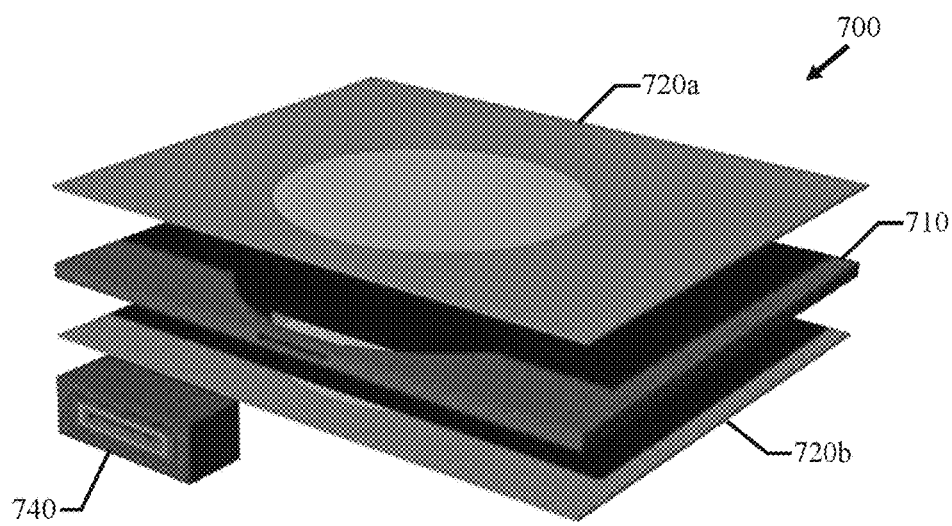
FIGS. 13A-B show schematics for an example of an actuator according to the present invention having a noise-reducing acoustic nozzle, with FIG. 13A showing an exploded view of the actuator layers, and FIG. 13B showing a cross-sectional view of the assembled actuator.
Figure 13B:
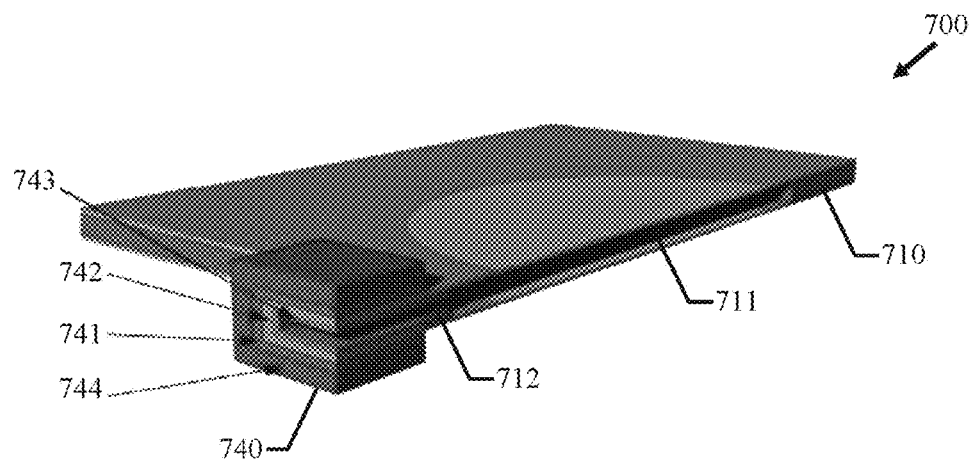

FIGS. 13a-13b show a further example of an actuator 700 that is composed of a laminated stack that comprises two oscillatory membranes 720a/720b and one cavity layer 710 having a cavity 711 and an orifice 712. An acoustic nozzle 740 attached to the exterior plane of the orifice 712 provides an extended airflow path in and out from the cavity 711. The acoustic nozzle 740 is adapted for reducing acoustic levels by providing an airflow path 741 that serves as an extension to the cavity 712, with an interior of the airflow path 741 being formed with an acoustic absorbent layer 742 and an acoustic substrate 743 that are made from material having highly absorptive character at one or more frequencies of acoustic of interest. Suitable examples of a highly absorptive acoustic material include, though are not limited to melamine, and acoustic foam. The acoustic nozzle 740 further includes an exterior ring 744 made of an acoustic barrier material for further attenuation of acoustic levels. Additional parameters of a preferred embodiment of the actuator 700 are provided below in Table II.

Figure 14A:
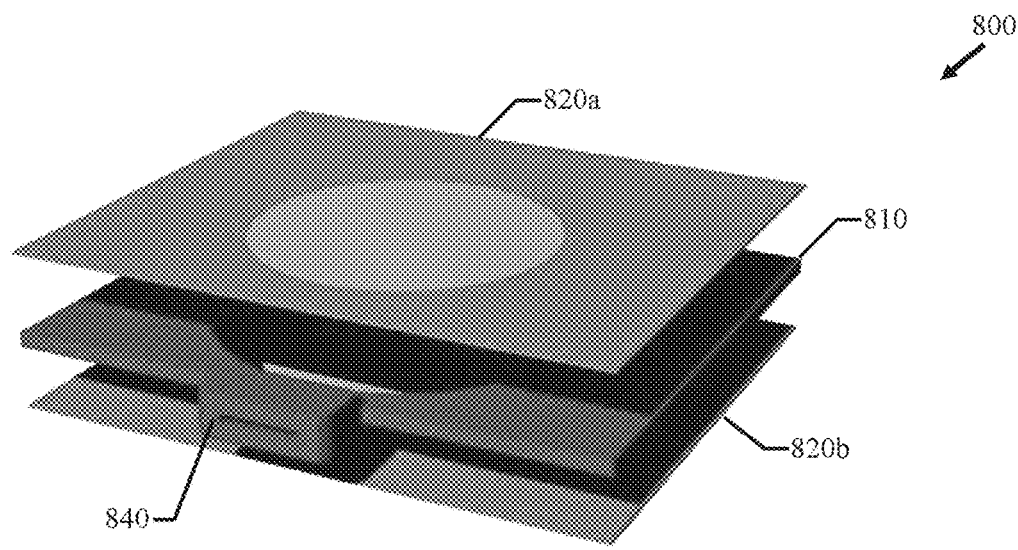
FIGS. 14A-B show schematics for an example of an actuator according to the present invention having an integrated acoustic nozzle, with FIG. 14A showing an exploded view of the actuator layers, and FIG. 14B showing a cross-sectional view of the assembled actuator with a cross-sectional view of the airflow path of the embedded acoustic nozzle.
Figure 14B:
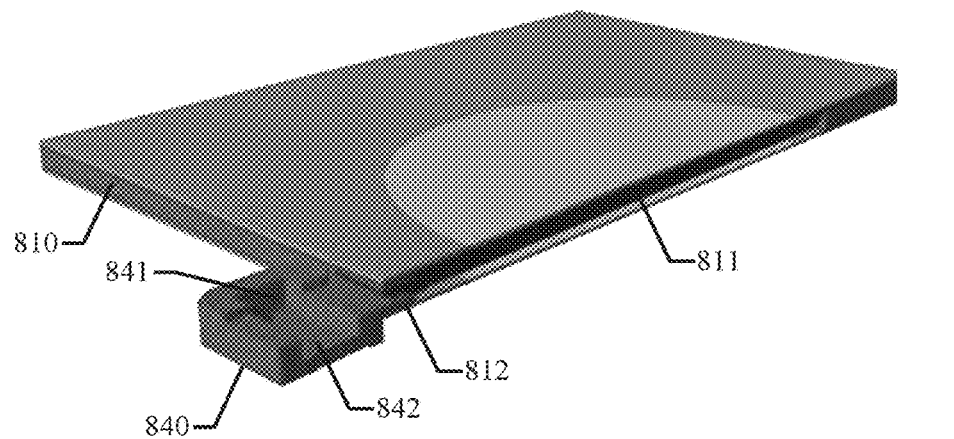

FIGS. 14a-14b show a further example of an actuator 800 that is comprised of a laminated stack that comprises two oscillatory membranes 820a/820b and one cavity layer 810 having a cavity 811 and an orifice 812. An acoustic nozzle 840 extends from an exterior plane of the orifice 812 and provides an extended airflow path 841 into and out from the cavity 811. In this example, the airflow path 841 of the acoustic nozzle 840 is formed with an expansion chamber 842 for attenuating acoustic levels. Additional parameters of a preferred embodiment of the actuator 800 are provided below in Table II.

Figure 15A:
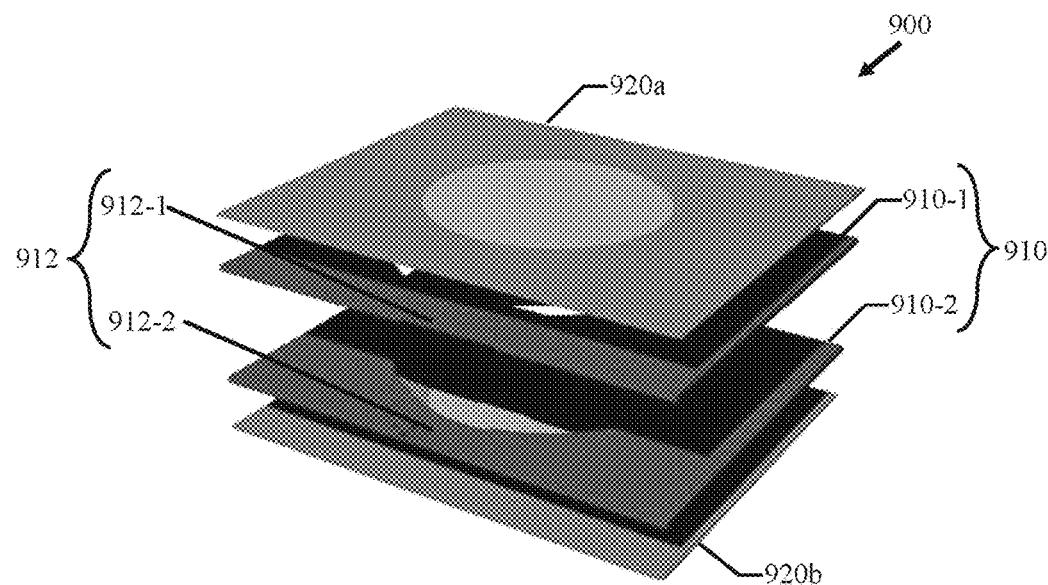
FIGS. 15A-B show schematics for an example of an actuator according to the present invention having an embedded acoustic nozzle, with FIG. 15A showing an exploded view of the actuator layers, and FIG. 15B showing a cross-sectional view of the airflow path of the embedded acoustic nozzle.
Figure 15B:
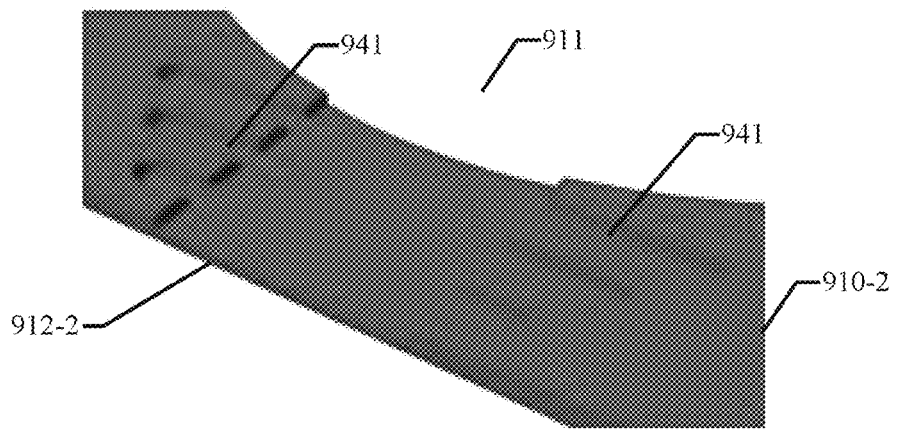

FIGS. 15a-15b show a further example of an actuator 900 that is composed of a laminated stack that comprises two oscillatory membranes 920a/920b and one cavity layer 910 having a cavity 911 and an orifice 912. FIG. 15a shows the actuator 900 in an exploded view with the cavity layer 910 separated into two halves 910-1/910-2, and the orifice 912 also separated into two halves 912-1/912-2. In this example, the cavity layer 910 is provided with an integrated expansion chamber 940 that includes a baffle arrangement 941 that is embedded into the orifice 912, through formation of an etched pattern in both orifices halves 912-1/912-2 of FIG. 15a. FIG. 15b show a partial close-up view of the orifice half 912-2 showing the baffle arrangement etched therein. The baffle arrangement 941 provides a buffering effect to an airflow passing through the orifice 912, which effectively reduces acoustic levels generated by the airflow. Additional parameters of a preferred embodiment of the actuator 900 are provided below in Table II.

Figure 16A:
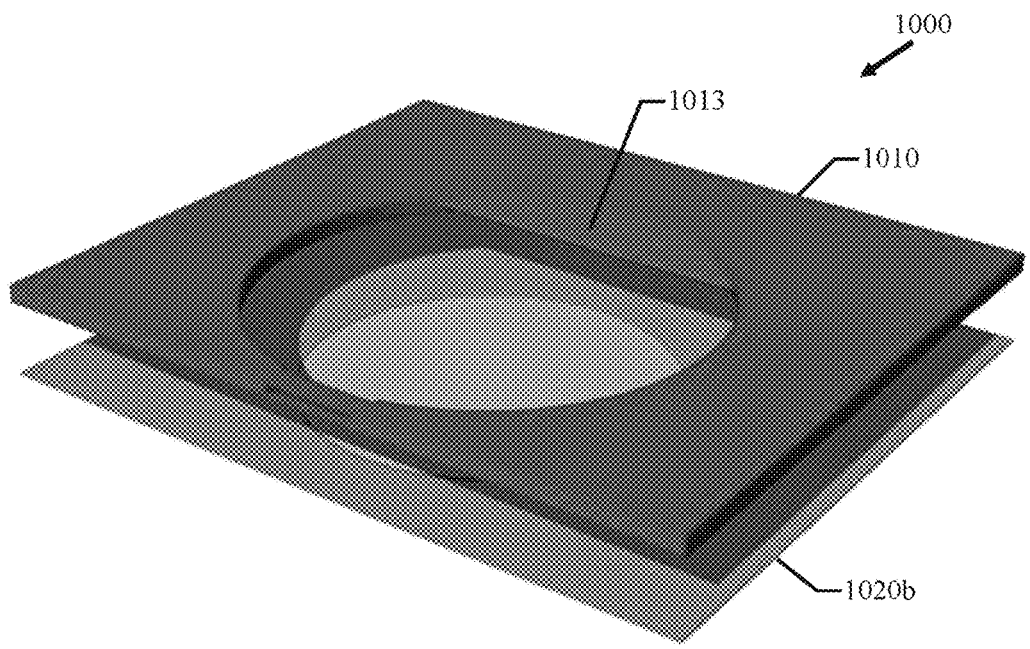
FIGS. 16A-B show schematics for an example of an actuator according to the present invention having a sloped cavity, with FIG. 16A showing an exploded view of the actuator layers, and FIG. 16B showing a cross-sectional view of the assembled actuator.
Figure 16B:
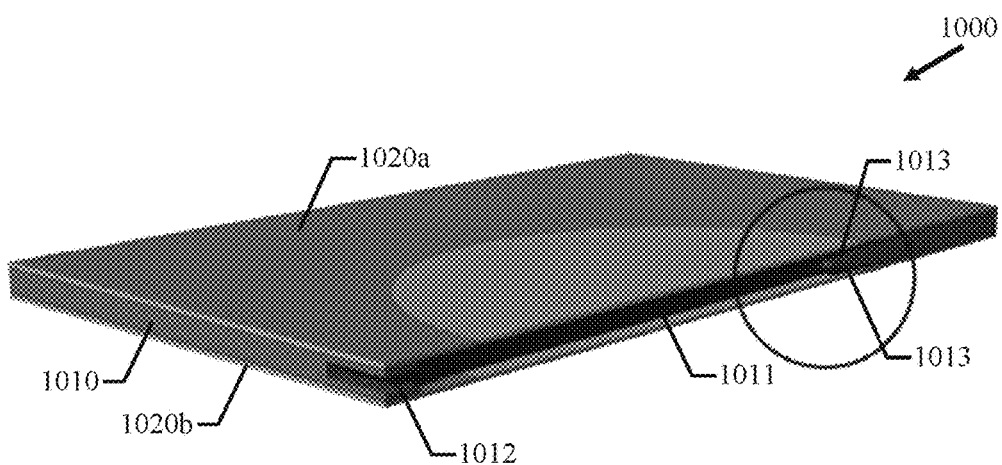

FIGS. 16a-16b show a further example of an actuator 1000 that is composed of a laminated stack that comprises two oscillatory membranes 1020a/1020b and one cavity layer 1010 having a sloped cavity 1011 and an orifice 1012. FIG. 16a omits an illustration of the top oscillatory membrane 1020a to provide a fuller view of the cavity 1011. In this example, a boundary surface forming the open volume of the cavity 1011 at a side opposite the orifice 1012 is formed with sloped surfaces 1013 that eliminate dead space and enhance internal pressure distribution within the cavity 1011. The sloped surface 1013 optimizes the shape of the cavity 1011 to further correspond with properties of the oscillatory membranes 1020a/1020b and the actuation frequency. In particular, the sloped surface 1013 is formed with opposite surfaces having curvatures that correspond to maximum curvatures incurred in the membranes 1020a/1020b when those membranes are at a maximum inward displacement toward the cavity 1011, though with a slight offset provided to the sloped surfaces such that the membranes do not contact the surfaces, thereby avoiding friction that may cause mechanical and thermal wear to the membranes. This construction of the sloped surfaces 1013 decreases a volume of the internal cavity 1011 by removing portions that would normally retain pockets of stale air that would not be compressed into a jet stream, thereby enhancing efficiency of the actuator, and reducing noise levels and power consumption. Additional parameters of a preferred embodiment of the actuator 1000 are provided below in Table II.

Figure 17:
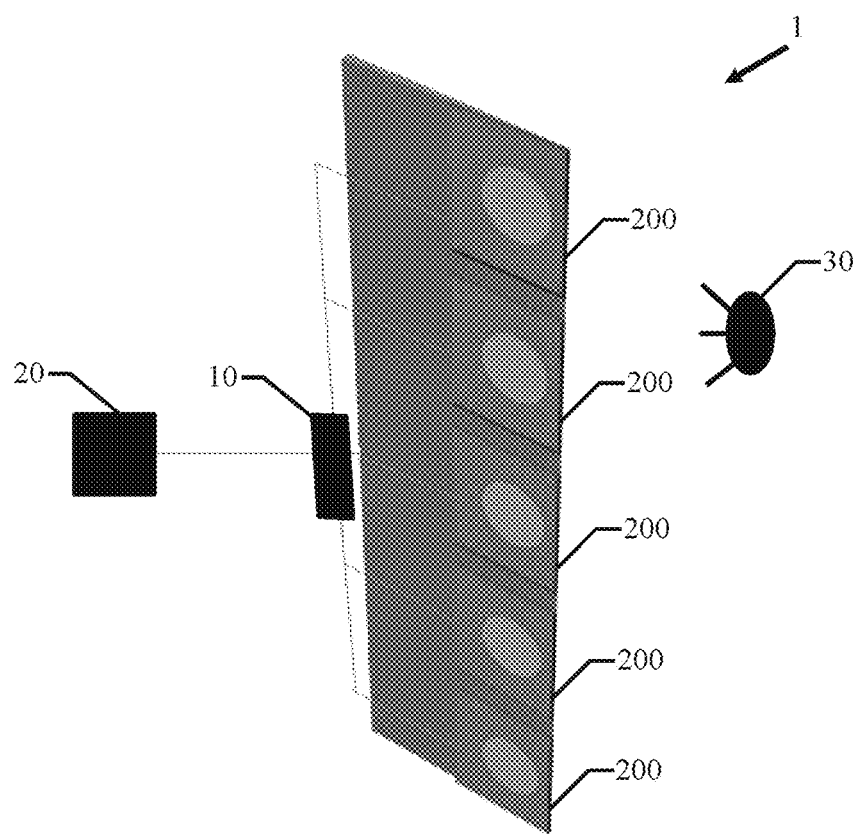
FIG. 17 shows a schematic of an array of synthetic jet actuators adapted for noise reduction through phase synchronization.

FIG. 17 shows an example of a system 1 comprising of an array formed of a plurality of actuators 200 that are each mounted in a common carrier platform (e.g., a surface mounting for commercial applications), and which are each operated by a common arrangement of a multi-channel driver 10, a controller 20, and one or more sensors 30. An AC voltage is supplied to each actuator 200 with individual phase adjustment for controlling the sound levels generated at a distance greater than that of two wavelengths, where the wave is effectively a plane wave. Phase control can be used to aim the soundwaves produced by each linear column of actuators 200, with the degree of acoustic benefit being adjustable depending on the phase coherence of the system 1. If each driver has a different phase response, then the acoustic benefit will not be as great as a system 1 with similarly phased drivers. By basic calculation, at a distance equivalent to two wavelengths, and with perfect phasing, the system 1 may be controlled to produce a zero acoustic level. Achieving such an ideal result is difficult in reality, due to challenges in aligning drivers, and further due to inconsistencies in driver manufacturing that result in phase differences. In examples according to the present invention, the phase difference between neighboring actuators 200 is adjusted based on noise levels measured while a driver is scanning different phase angles for each actuator 200 on two separate channels. While the system 1 is discussed in this example as comprising multiple actuators 200, it will be understood that the system 1 may include multiple actuators of any type discussed herein, including a combination of multiple different actuator types. Additional parameters of a preferred embodiment of the system 1 are provided below in Table II.

Systems and methods according to the present invention, including systems that adopt one or more of the foregoing examples, as well as systems that combine elements of two or more of the foregoing examples, are effective for producing synthetic jet actuators that are capable of overcoming the limitations of prior designs, including the generation of jet velocities with reduced noise levels below that which was previously thought possible, as further detailed in Table II below.

TABLE II

| Parameter | Units | Range | Preferred |
| --- | --- | --- | --- |
| Orifice sectional area | in$^2$ | 0.01-0.1 | .027 |
| Cavity diameter | Inch | 1-5 | 3.125 |
| Cavity volume | in$^3$ | 0.5-3 | 0.9 |
| Barrier material Weight | Lb/sq. ft | 0.5-20 | 2 |
| Barrier material TL@125 Hz | dB | 1-25 | 21 |
| Barrier material TL@250 Hz | dB | 130 | 22 |
| Barrier material TL@325 Hz | dB | 1-30 | 23 |
| Barrier material TL@500 Hz | dB | 1-35 | 27 |
| Barrier material TL@675 Hz | dB | 1-35 | 29 |

TABLE II-continued

| Parameter | Units | Range | Preferred |
|---|---|---|---|
| Barrier material TL@1000 Hz | dB | 1-35 | 33 |
| Acoustical volume to be filled with absorbent material | in³ | 1-30 | 1 |
| Piezoelectric Thickness | Inch | 0.002-0.200 | 0.010 |
| Number of Piezoelectrics Per Membrane | Each | 1-4 | 2 |
| Number of actuators in a synchronized-phase array | Each | 2-60 | 10 |
| Actuator Cross-Sectional Area | in² | 1-16 | 10 |
| Actuator thickness | In | 0.1-1 | 0.25 |
| Actuator Weight | G | 10-500 | 30 g |
| Jet Velocity | m/s | >50 | 100 |
| Resonance Frequency | Hz | 1-675 | 200 |
| Consumed Power | W | 0.1-40 | 5 |
| Sloped cavity length | Inch | 0-1 | 0.25 |
| Sound pressure level at 1 m away from actuator | dBA | 10-50 | 20 |

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

While a number of the foregoing examples forego illustration and/or discussion of certain elements that are discussed in other examples, it will be understood that each example may include or be made to include elements from one or more other examples. For instance, while some examples forego illustration and/or explicit discussion of a cohesive bond layer and/or an outer layer (such as cohesive bond 222 and outer layers 224 in FIGS. 2c and 3) it will be understood that each example discussed herein may include these elements. Likewise, while some examples discuss configurations with only a single cavity layer, with a single cavity and orifice, it will be understood that each example discussed herein is also contemplated as comprising multiple cavity layers, each with a respective cavity and orifice (e.g., examples in FIGS. 10-16, which are each illustrated with single cavity layers, may each comprise multiple cavity layers such as is illustrated in the example of FIG. 9). Furthermore, though the foregoing examples are discussed relative to an airflow, it will be understood that jet actuators according to the present invention are not limited to air and the generation of an airflow, and may be used with any suitable fluid for the generation of a corresponding fluid flow.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein.

The present invention is not limited to the exemplary embodiments illustrated herein, but is instead characterized by the appended claims, which in no way limit the scope of the disclosure.

What is claimed is:

1. A synthetic jet actuator comprising:
a first cavity layer comprising:
a body having first and second planar surfaces persistently formed in a preassembly phase, an outer perimeter, and an inner perimeter defining an internal cavity for reception of a fluid volume; and
an orifice providing a fluid communication between the cavity and an external atmosphere; and
a first oscillatory membrane comprising a piezoelectric material adapted to deflect the first oscillatory membrane in response to an electrical signal, the first oscillatory membrane corresponds in size and shape to the outer perimeter of the cavity layer and the piezoelectric material is sized and shaped to not exceed the inner perimeter of the cavity layer, wherein
the cavity has an opening in at least one of the first and second planar surfaces of the first cavity layer, and the first oscillatory membrane is positioned adjacent to a respective one of the first and second planar surfaces having the cavity opening and adapted as an enclosing surface to said cavity opening,
the first oscillatory membrane is adapted to compress and expand a volume within the cavity, based on a deflection generated by the piezoelectric material, for generating a fluid flow between the cavity and the external atmosphere through the orifice, and
the first cavity layer and the first oscillatory membrane are joined by an adhesive material; and
wherein the synthetic jet actuator further comprising: an acoustic nozzle comprising: an exterior ring made of an acoustic barrier material, with an acoustic substrate and an acoustic absorbent layer provided within the exterior ring, the acoustic substrate being positioned outside an extended flow path provided to the orifice of the cavity layer, and the acoustic absorbent layer being positioned outside the acoustic substrate.

2. The synthetic jet actuator of claim 1, wherein the adhesive material comprises at least one of: an adhesive film positioned between the first cavity layer and the first oscillatory membrane, and an adhesive liquid applied to a surface of at least one of the first cavity layer and the first oscillatory membrane.

3. The synthetic jet actuator of claim 1, wherein:
the first oscillatory membrane comprises a substrate, with the piezoelectric material joined to the substrate by a bonding material.

4. The synthetic jet actuator of claim 3, wherein:
the substrate and the bonding material are electrically conductive, and the substrate and the bonding material are adapted to act as an electrical connection for the delivery of an electrical signal to the piezoelectric material.

5. The synthetic jet actuator of claim 4, wherein:
the electrical connection is configured to provide a non-uniform spatial coverage on the piezoelectric material for producing an anisotropic deflection of the oscillatory membrane.

6. The synthetic jet actuator of claim 3, wherein:
the substrate has a tan delta of less than 0.5.

7. The synthetic jet actuator of claim 1, wherein the first oscillatory membrane is positioned such that a central axis of the oscillatory membrane aligns with a central axis of the cavity in the first cavity layer.

8. The synthetic jet actuator of claim 7, wherein a central axis of the piezoelectric material aligns with the central axis of the cavity in the first cavity layer.

9. The synthetic jet actuator of claim 1, wherein:
the first cavity layer comprises an expansion chamber embedded within the orifice, the expansion chamber comprising a series of baffles for buffering fluid flows that pass through the orifice.

10. The synthetic jet actuator of claim 1, wherein:
a boundary surface of the cavity in the first cavity layer comprises one or more sloped surfaces having a curvature that is predetermined to correspond with a curvature of the first oscillatory membrane in a deflected compression state for minimizing volume within the cavity that is predetermined to correspond with stagnant fluid flow.

11. The synthetic jet actuator of claim 1, wherein:
the first oscillatory membrane is adapted with a pre-stressed state such that in a non-powered state said oscillatory membrane rests at a neutral axis that provides a slightly expanded state to the cavity of the first cavity layer, and such that the first oscillatory membrane is forced to buckle upon deflecting to a compressed state under power of the piezoelectric material.

12. The synthetic jet actuator of claim 1, wherein:
the first oscillatory membrane is adapted with a pre-stressed state.

13. The synthetic jet actuator of claim 1, wherein:
the actuator is configured to generate jet velocities greater than 50 m/s to 100 M/s at resonance frequencies below 500 Hz.

14. The synthetic jet actuator of claim 13, wherein:
the actuator is configured to generate jet velocities in a range of greater than 50 m/s to 100 M/s at resonance frequencies in a range of about 150 Hz to 475 Hz.

15. The synthetic jet actuator of claim 1, further comprising:
a second oscillatory membrane comprising a piezoelectric material adapted to deflect the second oscillatory membrane in response to an electrical signal, wherein
the cavity of the first cavity layer is formed as a through-hole passing through the entire cavity layer, the cavity having two openings at opposite planar surfaces of the first cavity layer,
the first oscillatory membrane is positioned adjacent to the first planar surface of the first cavity layer having a first opening of the cavity and is adapted as an enclosing surface to said first cavity opening, and the second oscillatory membrane is positioned adjacent to the second planar surface of the first cavity layer having a second opening of the cavity and is adapted as an enclosing surface to said second cavity opening, and
both the first and second oscillatory membranes are adapted to compress and expand a volume within the cavity, based on deflections generated by the respective piezoelectric materials in the separate oscillatory membranes, for generating fluid flow between the cavity and the external atmosphere through the orifice.

16. The synthetic jet actuator of claim 15, wherein
the first and second oscillatory membranes are both positioned such that central axes of both respective oscillatory membranes align with a central axis of the cavity in the first cavity layer.

17. The synthetic jet actuator of claim 16, wherein
central axes of the piezoelectric material of both respective oscillatory membranes align with the central axis of the cavity in the first cavity layer.

18. The synthetic jet actuator of claim 1, further comprising:
a second cavity layer comprising a second internal cavity for reception of another fluid volume and an orifice providing a fluid communication between the second internal cavity and an external atmosphere;
a second oscillatory membrane comprising a piezoelectric material adapted to deflect the second oscillatory membrane in response to an electrical signal; and
a third oscillatory membrane comprising a piezoelectric material adapted to deflect the third oscillatory membrane in response to an electrical signal, wherein
the cavities in both the first and second cavity layers are formed as through-holes passing through the entirety of the respective cavity layer, both cavities having two openings at opposite planar surfaces of the respective cavity layer,
the first oscillatory membrane is positioned adjacent to the first planar surface of the first cavity layer having a first opening of the cavity in the first cavity layer and is adapted as an enclosing surface to said first cavity opening of the cavity in the first cavity layer,
the second oscillatory membrane is positioned adjacent to both the second planar surface of the first cavity layer having a second opening of the cavity in the first cavity layer and a first planar surface of the second cavity layer having a first opening of the cavity in the second cavity layer and is adapted as an enclosing surface to both said second cavity opening of the cavity in the first cavity layer and said first cavity opening of the cavity in the second cavity layer,
and the third oscillatory membrane is positioned adjacent to a second planar surface of the second cavity layer having a second opening of the cavity in the second cavity layer and is adapted as an enclosing surface to said second cavity opening of the cavity in the second cavity layer,
both the first and second oscillatory membranes are adapted to compress and expand a volume within the cavity of the first cavity layer, based on deflections generated by the respective piezoelectric materials in the separate oscillatory membranes, for generating fluid flow between the cavity of the first cavity layer and the external atmosphere through the orifice, and
both the second and third oscillatory membranes are adapted to compress and expand a volume within the cavity of the second cavity layer, based on deflections generated by the respective piezoelectric materials in the separate oscillatory membranes, for generating fluid flow between the second internal cavity and the external atmosphere through the orifice.

19. The synthetic jet actuator of claim 18, wherein
the second oscillatory membrane is adapted to expand the volume within the cavity of the second cavity layer while concurrently compressing the volume within the cavity of the first cavity layer, and to compress the volume within the cavity of the second cavity layer while concurrently expanding the volume within the cavity of the first cavity layer.

20. The synthetic jet actuator of claim 1, further comprising:
a second cavity layer comprising an internal cavity for reception of a fluid volume and an orifice providing a fluid communication between the cavity of the second cavity layer and an external atmosphere, wherein
the cavities in both the first and second cavity layers are formed as blind-holes having only a single opening in one planar surface of the respective cavity layers,
the first oscillatory membrane is positioned between the first and second cavity layers, adjacent to the planar surface of the first cavity layer having the cavity opening of the cavity in the first cavity layer and adjacent to a planar surface of the second cavity layer having the cavity opening of the cavity in the second cavity layer, the first oscillatory membrane is adapted to compress and expand the volume within the cavity of the first cavity layer, and to compress and expand the volume within the cavity of the second cavity layer.

21. The synthetic jet actuator of claim 20, wherein the first oscillatory membrane is adapted to expand the volume within the cavity of the second cavity layer while concurrently compressing the volume within the cavity of the first cavity layer, and to compress the volume within the cavity of the second cavity layer while concurrently expanding the volume within the cavity of the first cavity layer.

22. The synthetic jet actuator of claim 1, further comprising:

an acoustical enclosure provided outside of the first cavity layer and the first oscillatory membrane for containing noise generated by the first oscillatory membrane.

23. The synthetic jet actuator of claim 22, wherein:

the acoustical enclosure comprises an outer shell with an absorbent material and an acoustic barrier positioned within the outer shell, the absorbent material being positioned outside of the oscillatory membrane and the acoustic barrier being positioned outside of the absorbent material.

24. The synthetic jet actuator of claim 1, wherein:

the acoustic nozzle is positioned at an exterior of the orifice of the first cavity layer, and accommodating the extended flow path for fluid flows passing into and out from the orifice.

25. The synthetic jet actuator of claim 24, wherein:

the acoustic nozzle is a monolithically integral component of the cavity layer, and the extended flow path provided within the acoustic nozzle comprises a flow expansion chamber.

26. A method of making an actuator according to claim 1, the method comprising:

positioning the first oscillatory membrane adjacent to one of the first and second planar surfaces of the first cavity layer having the cavity opening and joining the first oscillatory membrane and the cavity layer by the adhesive material.

27. The method according to claim 26, further comprising:

forming the oscillatory membrane by joining the piezoelectric material to a substrate.

28. The method according to claim 26, further comprising:

pre-stressing the oscillatory membrane during assembly through heat forming.

29. The method according to claim 28, wherein:

heat forming of the oscillatory membrane is performed via voltage compression.

30. The method according to claim 26, further comprising:

pre-stressing the oscillatory membrane during assembly by electrically actuating the piezoelectric material.

31. The method according to claim 26, further comprising:

positioning an independent mass structure within the oscillatory membrane, adjacent the piezoelectric material.

32. The method according to claim 31, wherein:

the independent mass structure is joined to the piezoelectric material with an adhesive.

33. The method according to claim 26, further comprising:

generating a vacuum pressure to apply a uniform atmospheric pressure to press the first cavity layer and oscillatory membrane together.

34. The method according to claim 33, further comprising:

heat curing the first cavity layer and oscillatory membrane while applying the uniform atmospheric pressure.

35. The synthetic jet actuator of claim 1, wherein the adhesive material comprises at least one member selected from the group consisting of: thermoset, epoxy, methacrylate, and silver solder.

* * * * *